United States Patent
Bantukul et al.

(10) Patent No.: US 8,538,000 B2
(45) Date of Patent: Sep. 17, 2013

(54) METHODS, SYSTEMS, AND COMPUTER PROGRAM PRODUCTS FOR PERFORMING MESSAGE DEPOSIT TRANSACTION SCREENING

(75) Inventors: Apirux Bantukul, Cary, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 1422 days.

(21) Appl. No.: 11/982,549

(22) Filed: Nov. 2, 2007

(65) Prior Publication Data

US 2009/0043704 A1  Feb. 12, 2009

Related U.S. Application Data

(60) Provisional application No. 60/964,335, filed on Aug. 10, 2007.

(51) Int. Cl.
*H04M 3/42* (2006.01)
*H04M 1/64* (2006.01)

(52) U.S. Cl.
USPC ....................... 379/211.01; 379/70

(58) Field of Classification Search
USPC ............... 709/220, 227; 455/415; 370/352, 370/260; 379/201.01, 67.1, 68, 69, 70, 71, 379/72, 88
See application file for complete search history.

(56) References Cited

U.S. PATENT DOCUMENTS

| | | | |
|---|---|---|---|
| 4,310,727 A | 1/1982 | Lawser | |
| 4,754,479 A | 6/1988 | Bicknell et al. | |
| 4,819,156 A | 4/1989 | DeLorme et al. | |
| 5,089,954 A | 2/1992 | Rago | |
| 5,237,604 A | 8/1993 | Ryan | |
| 5,247,571 A | 9/1993 | Kay et al. | |
| 5,251,248 A | 10/1993 | Tokunaga et al. | |
| 5,400,390 A | 3/1995 | Salin | |
| 5,422,941 A | 6/1995 | Hasenauer et al. | |

(Continued)

FOREIGN PATENT DOCUMENTS

| | | |
|---|---|---|
| CN | 1968267 A | 5/2007 |
| CN | ZL 200680051295.9 | 3/2013 |

(Continued)

OTHER PUBLICATIONS

Notification of Transmittal of the International Search Report and the Written Opinion of the International Searching Authority, or the Declaration for International Application No. PCT/US2008/072641 (Feb. 24, 2009).

(Continued)

*Primary Examiner* — Mohammad Islam
*Assistant Examiner* — Kharye Pope
(74) *Attorney, Agent, or Firm* — Jenkins, Wilson, Taylor & Hunt, P.A.

(57) ABSTRACT

The subject matter described herein includes methods, systems, and computer program products for performing message deposit transaction screening. One method includes receiving a call setup signaling message for a call for which a message deposit transaction is indicated and determining a message deposit transaction parameter associated with the message deposit transaction based on the signaling message. At least one message deposit transaction screening criterion is determined for the message deposit transaction based on the at least one message deposit transaction parameter. A message deposit transaction screening action is performed based on application of the screening criterion to the message deposit transaction parameter.

22 Claims, 13 Drawing Sheets

(56) References Cited

U.S. PATENT DOCUMENTS

| | | |
|---|---|---|
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,377,674 B1 | 4/2002 | Chong et al. |
| 6,411,632 B2 | 6/2002 | Lindgren et al. |
| 6,424,832 B1 | 7/2002 | Britt et al. |
| 6,434,144 B1 | 8/2002 | Romanov |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,775,737 B1 | 8/2004 | Warkhede et al. |
| 6,795,701 B1 | 9/2004 | Baker et al. |
| 6,836,477 B1 | 12/2004 | West, Jr. et al. |
| 6,839,421 B2 | 1/2005 | Ferraro Esparza et al. |
| 6,871,070 B2 | 3/2005 | Ejzak |
| 6,885,872 B2 | 4/2005 | McCann et al. |
| 6,917,612 B2 | 7/2005 | Foti et al. |
| 6,950,441 B1 | 9/2005 | Kaczmarczyk et al. |
| 6,993,038 B2 | 1/2006 | McCann |
| 7,010,002 B2 | 3/2006 | Chow et al. |
| 7,027,433 B2 | 4/2006 | Touhino et al. |
| 7,027,582 B2 | 4/2006 | Khello et al. |
| 7,035,239 B2 | 4/2006 | McCann et al. |
| 7,039,037 B2 | 5/2006 | Wang et al. |
| 7,054,652 B2 | 5/2006 | Luis |
| 7,079,524 B2 | 7/2006 | Bantukul et al. |
| 7,079,853 B2 | 7/2006 | Rathnasabapathy et al. |
| 7,092,505 B2 | 8/2006 | Allison et al. |
| 7,170,982 B2 | 1/2007 | Li et al. |
| 7,221,952 B2 | 5/2007 | Cho et al. |
| 7,274,683 B2 | 9/2007 | Segal |
| 7,286,839 B2 | 10/2007 | McCann et al. |
| 7,366,530 B2 | 4/2008 | McCann et al. |
| 7,397,773 B2 | 7/2008 | Qu et al. |
| 7,415,007 B2 * | 8/2008 | Huang ........................ 370/352 |
| 7,457,283 B2 | 11/2008 | Dalton, Jr. et al. |
| 7,551,608 B1 | 6/2009 | Roy |
| 7,627,108 B1 | 12/2009 | Enzmann et al. |
| 7,693,135 B2 | 4/2010 | Pershan |
| 7,715,367 B2 | 5/2010 | Nishida et al. |
| 7,746,864 B1 | 6/2010 | Asawa et al. |
| 7,751,386 B2 | 7/2010 | Kobayashi et al. |
| 7,756,518 B2 | 7/2010 | Xu et al. |
| 7,889,716 B2 | 2/2011 | Tejani et al. |
| 7,996,541 B2 | 8/2011 | Marathe et al. |
| 2001/0008532 A1 | 7/2001 | Lee |
| 2001/0029182 A1 | 10/2001 | McCann et al. |
| 2001/0030957 A1 | 10/2001 | McCann et al. |
| 2001/0040957 A1 | 11/2001 | McCann et al. |
| 2001/0055380 A1 | 12/2001 | Benedyk et al. |
| 2002/0054674 A1 | 5/2002 | Chang et al. |
| 2002/0095421 A1 | 7/2002 | Koskas |
| 2002/0114440 A1 | 8/2002 | Madour et al. |
| 2002/0147845 A1 | 10/2002 | Sanchez-Herrero et al. |
| 2002/0173320 A1 | 11/2002 | Aitken et al. |
| 2002/0176382 A1 | 11/2002 | Madour et al. |
| 2002/0176562 A1 | 11/2002 | Hao |
| 2003/0007482 A1 | 1/2003 | Khello et al. |
| 2003/0013464 A1 | 1/2003 | Jean Henry-Labordere |
| 2003/0026289 A1 | 2/2003 | Mukherjee et al. |
| 2003/0054844 A1 | 3/2003 | Anvekar et al. |
| 2003/0065788 A1 | 4/2003 | Salomaki |
| 2003/0109271 A1 | 6/2003 | Lewis et al. |
| 2003/0181206 A1 | 9/2003 | Zhou et al. |
| 2003/0193967 A1 | 10/2003 | Fenton et al. |
| 2003/0220951 A1 | 11/2003 | Muthulingam et al. |
| 2003/0227899 A1 | 12/2003 | McCann |
| 2004/0003114 A1 | 1/2004 | Adamczyk |
| 2004/0034699 A1 | 2/2004 | Gotz et al. |
| 2004/0053604 A1 | 3/2004 | Ratilainen et al. |
| 2004/0053610 A1 | 3/2004 | Kim |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0125925 A1 | 7/2004 | Marsot |
| 2004/0141488 A1 | 7/2004 | Kim et al. |
| 2004/0142707 A1 | 7/2004 | Midkiff et al. |
| 2004/0196963 A1 * | 10/2004 | Appelman et al. ......... 379/88.12 |
| 2004/0198351 A1 | 10/2004 | Knotts |
| 2004/0202187 A1 | 10/2004 | Kelly et al. |
| 2004/0243596 A1 | 12/2004 | Lillqvist et al. |
| 2004/0246965 A1 | 12/2004 | Westman et al. |
| 2005/0100145 A1 * | 5/2005 | Spencer et al. ............ 379/88.22 |
| 2005/0101297 A1 | 5/2005 | Delaney et al. |
| 2005/0119017 A1 | 6/2005 | Lovell, Jr. et al. |
| 2005/0143075 A1 | 6/2005 | Halsell |
| 2005/0182781 A1 | 8/2005 | Bouvet |
| 2005/0251509 A1 | 11/2005 | Pontius |
| 2006/0002308 A1 | 1/2006 | Na et al. |
| 2006/0034256 A1 | 2/2006 | Addagatla et al. |
| 2006/0067338 A1 | 3/2006 | Hua et al. |
| 2006/0072726 A1 * | 4/2006 | Klein et al. .............. 379/201.01 |

| | | | |
|---|---|---|---|
| 2006/0077957 A1* | 4/2006 | Reddy et al. | 370/352 |
| 2006/0095575 A1* | 5/2006 | Sureka et al. | 709/227 |
| 2006/0098621 A1 | 5/2006 | Plata et al. | |
| 2006/0136557 A1 | 6/2006 | Schaedler et al. | |
| 2006/0165068 A1 | 7/2006 | Dalton et al. | |
| 2006/0225128 A1 | 10/2006 | Aittola et al. | |
| 2006/0245573 A1 | 11/2006 | Sheth et al. | |
| 2006/0293021 A1 | 12/2006 | Zhou | |
| 2007/0019625 A1* | 1/2007 | Ramachandran et al. | 370/352 |
| 2007/0061397 A1 | 3/2007 | Gregorat et al. | |
| 2007/0104184 A1 | 5/2007 | Ku et al. | |
| 2007/0115934 A1 | 5/2007 | Dauster et al. | |
| 2007/0116250 A1 | 5/2007 | Stafford | |
| 2007/0133574 A1 | 6/2007 | Tejani et al. | |
| 2007/0133757 A1* | 6/2007 | Girouard et al. | 379/67.1 |
| 2007/0243876 A1 | 10/2007 | Duan | |
| 2008/0037759 A1 | 2/2008 | Chin et al. | |
| 2008/0084975 A1* | 4/2008 | Schwartz | 379/88.22 |
| 2008/0109532 A1 | 5/2008 | Denoual et al. | |
| 2008/0112399 A1 | 5/2008 | Cohen et al. | |
| 2008/0114862 A1* | 5/2008 | Moghaddam et al. | 709/220 |
| 2008/0137832 A1 | 6/2008 | Heinze et al. | |
| 2008/0171544 A1 | 7/2008 | Li et al. | |
| 2008/0247526 A1 | 10/2008 | Qiu et al. | |
| 2008/0281975 A1 | 11/2008 | Qiu et al. | |
| 2008/0311917 A1 | 12/2008 | Marathe et al. | |
| 2009/0022146 A1* | 1/2009 | Huang | 370/352 |
| 2009/0193071 A1 | 7/2009 | Qiu et al. | |
| 2009/0227276 A1 | 9/2009 | Agarwal et al. | |
| 2009/0264112 A1* | 10/2009 | De Zen et al. | 455/415 |
| 2010/0020728 A1* | 1/2010 | Jefferson et al. | 370/260 |
| 2010/0042525 A1 | 2/2010 | Cai et al. | |
| 2010/0177780 A1 | 7/2010 | Ophir et al. | |
| 2010/0285800 A1 | 11/2010 | McCann | |
| 2010/0299451 A1 | 11/2010 | Yigang et al. | |
| 2011/0116382 A1 | 5/2011 | McCann et al. | |
| 2011/0126277 A1 | 5/2011 | McCann et al. | |

FOREIGN PATENT DOCUMENTS

| | | |
|---|---|---|
| EP | 0 512 962 A2 | 11/1992 |
| EP | 0 936 825 A3 | 8/1999 |
| EP | 0 944 276 A1 | 9/1999 |
| EP | 1 285 545 B1 | 10/2004 |
| EP | 1 558 004 A | 7/2005 |
| EP | 1 742 452 A1 | 1/2007 |
| EP | 1 958 399 B1 | 2/2012 |
| KR | 2000-0037801 | 7/2000 |
| KR | 10-1998-0052565 | 5/2001 |
| KR | 2003-0040291 A1 | 5/2003 |
| KR | 10-2004-0107271 A | 12/2004 |
| WO | WO 95/12292 A1 | 5/1995 |
| WO | WO 96/11557 | 4/1996 |
| WO | WO 97/33441 A1 | 9/1997 |
| WO | WO 98/18269 | 4/1998 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 00/60821 | 10/2000 |
| WO | WO 01/47297 A2 | 6/2001 |
| WO | WO 01/48981 A1 | 7/2001 |
| WO | WO 01/54444 A1 | 7/2001 |
| WO | WO 03/005664 A2 | 1/2003 |
| WO | WO 03/021982 A1 | 3/2003 |
| WO | WO 03/105382 A | 12/2003 |
| WO | WO 2004/006534 | 1/2004 |
| WO | WO 2004/087686 A | 1/2004 |
| WO | WO 2004/075507 | 9/2004 |
| WO | WO 2004/102345 A2 | 11/2004 |
| WO | WO 2005/013538 A3 | 2/2005 |
| WO | WO 2006/072473 A1 | 7/2006 |
| WO | WO 2007/045991 A2 | 4/2007 |
| WO | WO 2007/064943 A2 | 6/2007 |
| WO | WO 2007/092205 A2 | 8/2007 |
| WO | WO 2007/146257 A2 | 12/2007 |
| WO | WO 2008/073226 | 6/2008 |
| WO | WO 2008/157213 A2 | 12/2008 |
| WO | WO 2009/018418 A2 | 2/2009 |
| WO | WO 2009/070179 A1 | 6/2009 |
| WO | WO 2011/047382 A2 | 4/2011 |

OTHER PUBLICATIONS

Notification of Transmittal of the International Search Report and the Written Opinion of the International Searching Authority, or the Declaration for International Application No. PCT/US2008/066675 (Dec. 9, 2008).

Notice of Allowance for U.S. Appl. No. 10/729,519 (Jul. 30, 2007).

"IP Multimedia Subsystem," printout from wikipedia.org, Wikimedia Foundation, Inc. (May 29, 2007).

Official Action for U.S. Appl. No. 10/729,519 (Nov. 28, 2006).

Notification Concerning Transmittal of International Preliminary Report on Patentability for International Application No. PCT/US2004/024328 (Jul. 20, 2006).

"HP OperCall Home Subscriber Server Software—Data Sheet", 4AA0-3360ENW Rev. 2, Hewlett-Packard Development Company, L.P. (Jul. 2006).

Notice of Allowance for U.S. Appl. No. 10/631,586 (May 25, 2006).

Notification of Transmittal of the International Search Report or the Declaration and Written Opinion of the International Searching Authority for International Application No. PCT/US2004/024328 (Apr. 25, 2006).

Supplemental Notice of Allowance for U.S. Appl. No. 09/747,070 (Feb. 10, 2006).

Notice of Allowance for U.S. Appl. No. 09/747,070 (Dec. 2, 2005).

Interview Summary for U.S. Appl. No. 09/747,070 (Dec. 2, 2005).

Advisory Action for U.S. Appl. No. 09/747,070 (Nov. 1, 2005).

Official Action for U.S. Appl. No. 10/631,586 (Oct. 26, 2005).

Notice of Allowance for U.S. Appl. No. 10/166,968 (Sep. 20, 2005).

Notice of Allowance for U.S. Appl. No. 09/471,946 (Oct. 15, 2004).

Final Official Action for U.S. Appl. No. 09/747,070 (May 11, 2005).

Official Action for U.S. Appl. No. 09/747,070 (Jun. 30, 2004).

Supplemental Notice of Allowability for U.S. Appl. No. 09/471,946 (May 24, 2004).

"Cisco IP Transfer Point as the Signaling Gateway for the Cisco BTS 10200 Softswitch," Cisco Systems, Inc., pp. 1-10 (Summer 2004).

"Cisco IP Transfer Point as the Signaling Gateway for the Cisco PGW 2200 Softswitch," Cisco Systems, Inc., pp. 1-11 (Summer 2004).

"Next-Generation Signaling Transports Cisco IP Transfer Point," Cisco Systems, Inc., pp. 1-27 (Summer 2004).

"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).

Notice of Allowance and Fee(s) Due for U.S. Appl. No. 09/471,946 (Feb. 6, 2004).

Walker, "The IP Revolution in Mobile Messaging," Packet, Cisco Systems Users Magazine, vol. 16, No. 1, pp. Cover; 73-74; and 89 (First Quarter 2004).

"Cisco ITP Multilayer Routing (MLR) SMS MO Routing Requirements," Cisco Systems, Inc., p. 1 (Copyright 2004).

"Cisco Signaling Gateway Manager Release 3.2 for Cisco IP Transfer Point," Cisco Systems, Inc., pp. 1-9 (Copyright 1992-2004).

"Solutions for Mobile Network Operators," Cisco Systems, Inc., pp. 1-8 (Copyright 1992-2004).

Official Action from European Patent Office in courterpart European Patent Application (Dec. 11, 2003).

Interview Summary for U.S. Appl. No. 09/471,946 (Dec. 9, 2003).

Communication pursuant to Article 96(2) EPC for European Application No. 00988270.5 (Nov. 12, 2003).

Notification of Transmittal of the International Search Report or the Declaration for International Application No. PCT/US2003/018266 (Oct. 31, 2003).

Office Communication for U.S. Appl. No. 09/759,743 (Oct. 20, 2003).

Official Action for U.S. Appl. No. 09/471,946 (Jul. 9, 2003).

Moodie, "Agilent acceSS7: White Paper," Agilent Technologies, pp. 1-14 (Apr. 1, 2003).

Notice of Allowance and Fee(s) Due for U.S. Appl. No. 09/759,743 (Mar. 10, 2003).

Interview Summary for U.S. Appl. No. 09/759,743 (Feb. 27, 2003).
"Cisco IP Transfer Point," Cisco Systems, Inc., pp. 1-10 (Copyright 1992-2003).
"Cisco IP Transfer Point Multilayer Short Message Serivce Routing Solution," Cisco Systems, Inc., pp. 1-6 (Copyright 1992-2003).
"Cisco ITP MAP Gateway for Public WLAN SIm Authentication and Authorization," Cisco Systems, Inc., pp. 1-13 (Copyright 1992-2003).
Final Official Action for U.S. Appl. No. 09/759,743 (Dec. 2, 2002).
Barry, "A Signal for Savings," Packet, Cisco Systems Users Magazine, vol. 14, No. 4, pp. Cover; 19-21; and 81 (Fourth Quarter 2002).
Interview Summary for U.S. Appl. No. 09/759,743 (Sep. 13, 2002).
Official Action for U.S. Appl. No. 09/759,743 (May 23, 2002).
Interview Summary for U.S. Appl. No. 09/759,743 (Mar. 6, 2002).
"Agilent Tchnologies and Cisco Systems SS7 Over IP White Paper," Cisco Systems, Inc. and Agilent and Technologies, pp. 1-6 (Copyright 2002-Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
Notification of Transmittal of International Preliminary Examination Report for International Application No. PCT/US1999/030861 (Dec. 28, 2001).
Official Action for U.S. Appl. No. 09/759,743 (Dec. 3, 2001).
International Preliminary Examination Report for International Application No. PCT/US01/01052 (Nov. 7, 2001).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001-Printed in the UK Nov. 30, 2001).
International Search Report for International Application No. PCT/US00/34924 (May 16, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
Notification of Transmittal of the International Search Report or the Declaration for International Application No. PCT/US1999/030861 (Mar. 17, 2000).
"Topsail Beach—SS7 Over IP-" Cisco Systems, Inc., pp. 1-16 (Copyright 1999).
ETSI, "Digital Cellular Telecommunications Systems (Phase 2++); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7—Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," At&T Network Systems, No. 1, p. 1-75, (Feb. 2, 1996).

ETSI, Digital Cellular Telecommunications System (Phase 2+); Milbe Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN and intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network interface Specification (CCSNIS) Supporting SCCP and TCAP," Bell Communications Research, p. ii-xii, 1-1—C-22, (Mar. 1994).
Buckles, "Very High Capacity Signaling Trnsfer Point for Intelligent Network Servcies," DSC Communciations Corporation, p. 1308-1311, (1988).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1-pp. 1-8 (Publication Date Unknown).
"Configuring ITP Basic Functionally," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Official Action for U.S. Appl. No. 11/291,502 (May 13, 2009).
Commonly assigned, co-pending U.S. Appl. No. 12/400,576 for, "Methods, Systems, and Computer Readable media for Routing a Message Service Message Trhough a Communications Network," filed on Mar. 9, 2009.
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Communication of European publication number and information on the application of Article 67(3) EPC for Application No. 06844747.3 (Jul. 23, 2008).
Notice of Allowance and Fee(s) Due for U.S. Appl. No. 11/112,126 (Mar. 28, 2008).
Notice of Allowance and Fee(s) Due for U.S. Appl. No. 11/112,126 (Dec. 17, 2007).
Official Action for U.S. Appl. No. 11/112,126 (Jun. 15, 2007).
Communication pursuant to Rules 109 and 110 EPC for European Application No. 04751843.6 (Dec. 16, 2005).
Notification Concerning Transmittal of International Preliminary Report on Patentability (Chapter I of the Patent Cooperation Treaty) in International Application No. PCT/US2004/014645 (Nov. 24, 2005).
Supplemental Notice of Allowance and Fee(s) Due for U.S. Appl. No. 10/842,394 (Feb. 9, 2005).
Notification of Transmittal of the International Search Report and the Written Opinion of the International Searching Authority, or the Declaration for International Application No. PCT/US2004/014645 (Dec. 16, 2004).
Notice of Allowance and Fee(s) Due for U.S. Appl. No. 10/842,394 (Dec. 15, 2004).

Notification of Transmittal of the International Search Report and the Written Opinion of the International Searching Authority, or the Declaration for International Application No. PCT/US04/06247 (Nov. 10, 2004).

Notification of Transmittal of the International Search Report and The Written Opinion of the International Searching Authority, or the Declaration for International application No. PCT/US2009/036538 (Sep. 30, 2009).

Supplementary European Search Report for European application No. 04751843.6 (Aug. 7, 2009).

Communication pursuant to Article 94(3) EPC for European application No. 06844747.3 (Jul. 28, 2009).

Notice of Allowance and Fee(s) Due for U.S. Appl. No. 11/888,907 (Apr. 1, 2011).

"Ericsson Unified Number Portability," (Downloaded from the Internet on Jan. 24, 2011).

Chinese Official Action for Chinese Patent Application No. 200680051295.9 (Dec. 24, 2010).

Notification of Transmittal of the International Search Report and the Written Opinion of the International Searching Authority, or the Declaration for International Application No. PCT/US2010/034372 (Nov. 30, 2010).

Notice of Allowance and Fee(s) Due for U.S. Appl. No. 11/291,502 (Oct. 5, 2010).

Official Action for U.S. Appl. No. 11/888,907 (Sep. 16, 2010).

Communication pursuant to Article 94(3) EPC for European application No. 03734522.0 (Aug. 19, 2010).

Tsou et al., "Realm-Based Redirection in Diameter," draft-ietf-dime-realm-based-redirect-03, RFC 3588, pp. 1-6 (Jul. 12, 2010).

Communication Pursuant to Article 94(3) EPC for European Application No. 06844747.3 (May 11, 2010).

"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).

Supplemental European Search Report for European application No. 03734522.0 (Feb. 23, 2010).

Final Official Action for U.S. Appl. No. 11/291,502 (Feb. 4, 2010).

Korhonen et al., "Clarifications on the Routing of Diameter Requests Based on the Username and the Realm," RFC 5729, pp. 1-9 (Dec. 2009).

Supplementary European Search Report for European Patent No. 1676386 (Oct. 30, 2009).

"3$^{rd}$ Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9), " 3GPP TS 29.272, V9.0.0, pp. 1-71 (Sep. 2009).

Supplementary European Search Report for European Application No. 06844747.3 (Apr. 24, 2009).

"3rd Generation Partnership Project; Technical Specification Group Services and System Aspects; Policy and charging control architecture (Release 8)," 3GPP TS 23.203, V8.1.1, pp. 1-87 (Mar. 2008).

Notification of European publication number and information on the application of Article 67(3) EPC for European Application No. 04751843.6 (Dec. 29, 2005).

Notification of European Publication Number and Information on the Application of Article 67(3) EPC for European Application No. 03734522.0 (Mar. 23, 2005).

Schwarz, "ENUM Trial to Link Phone, Internet Addresses," (Mar. 22, 2005).

Peterson, "Telephone Number Mapping (ENUM) Service Registration for Presence Services," Network Working Group, RFC 3953 (Jan. 2005).

3GPP, "3$^{rd}$ Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).

Peterson et al., "Using E.164 Numbers With the Session Initiation Protocol (SIP)," Network Working Group, RFC 3824, pp. 1-14 (Jun. 2004).

Foster et al., "Number Portability in the Global Switched Telephone Network (GSTN): An Overview," Network Working Group, RFC 3482 (Feb. 2003).

"Global Implementation of ENUM: A Tutorial Paper," International Telecommunication Union, Telecommunication Standardization Union, Study Group 2, (Feb. 8, 2002).

Mealling, "The Naming Authority Pointer (NAPTR) DNS Resource Record," Network Working Group, RFC 2915 (Sep. 2000).

Applicant-Initiated Interview Summary for U.S. Appl. No. 12/906,816 (Jan. 27, 2012).

Notice of Allowance and Fee(s) Due for U.S. Appl. No. 11/605,837 (Jan. 20, 2012).

Decision to Grant a European Patent Pursuant to Article 97(1) EPC for European Patent Application No. 06844747.3 (Jan. 19, 2012).

Communication Pursuant to Article 94(3) EPC for Eurpoean Patent Application No. 04751843.6 (Dec. 15, 2011).

Final Official Action for U.S. Appl. No. 11/635,406 (Nov. 30, 2011).

Second Office Action for Chinese Patent Application No. 200680051295.9 (Oct. 9, 2011).

Non-Final Official Action for U.S. Appl. No. 12/906,816 (Oct. 5, 2011).

Notice of Panel Decision from Pre-Appeal Brief Review for U.S. Appl. No. 11/635,406 (Oct. 3, 2011).

Non-Final Official Action for U.S. Appl. No. 12/906,998 (Sep. 21, 2011).

Non-Final Official Action for U.S. Appl. No. 12/400,576 (Aug. 24, 2011).

Communication under Rule 71(3) EPC for European Application No. 06 844 747.3 (Jul. 19, 2011).

Notification of Transmittal of the International Search Report and the Written Opinion of the International Searching Authority, or the Declaration for International Application No. PCT/US2010/053062 (Jun. 28, 2011).

Notice of Publication of Abstract for Indian Patent Application No. 6406/CHENP/2010 A (Jun. 17, 2011).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.4.0, pp. 1-71 (Sep. 2009).

Jones et al., "Diameter Command Code Registration for the Third Generation Partnership Project (3GPP) Evolved Packet System (EPS)," Network Working Group, RFC 5516, pp. 1-5 (Apr. 2009).

Tschofenig et al., "Securing the Next Steps in Signaling (NSIS) Protocol Suite," International Journal of Internet Protocol Technology, vol. 1, pp. 1-14 (2006).

Stiemerling et al., "NAT/Firewall NSIS Signaling Layer Protocol (NSLP)," draft-ietf-nsis-nslp-natfw-06, pp. 1-70 (May 16, 2005).

Calhoun et al., "Diameter Base Protocol," RFC 3588, pp. 1-90 (Sep. 2003).

Advisory Action for U.S. Appl. No. 12/400,576 (Jun. 26, 2012).

Advisory Action for U.S. Appl. No. 12/906,816 (Jun. 5, 2012).

Applicant-Initiated Interview Summary for U.S. Appl. No. 12/906,816 (May 17, 2012).

Notice of Allowance and Fee(s) Due for U.S. Appl. No. 11/635,406 (Apr. 20, 2012).

Final Official Action for U.S. Appl. No. 12/906,998 (Mar. 29, 2012).

Third Office Action for Chinese Patent Application No. 200680051295.9 (Mar. 20, 2012).

Final Official Action for U.S. Appl. No. 12/400,576 (Mar. 9, 2012).

Final Official Action for U.S. Appl. No. 12/906,816 (Feb. 21, 2012).

Notice of Granting Patent Right for Invention for Chinese Patent Application No. 200680051295.9 (Nov. 6, 2012).

Non-Final Official Action for U.S. Appl. No. 12/777,853 (Aug. 29, 2012).

First Office Action for Chinese Patent Application No. 200880110878.3 (Aug. 27, 2012).

Communication of European publication number and information on the application of Article 67(3) EPC for European Application No. 10824243.9 (Jul. 25, 2012).

First Official Action for Chinese Patent Application No. 200880103119.4 (Jul. 4, 2012).

Notice of Allowance and Fee(s) Due for U.S. Appl. No. 12/777,853 (Feb. 7, 2013).
Non-Final Office Action for U.S. Appl. No. 12/906,998 (Jan. 2, 2013).
Communication Under Rule 71(3) EPC for European Patent Application No. 04779394.8 (Dec. 18, 2012).

Loshin, "19.4: Network Address Translation," TCP/IP Clearly Explained, Fourth Edition, Morgan Kaufman Publishers, pp. 435-437 (2003).

* cited by examiner

Exemplary "Blacklist" NMSS Data Structure

| Called Subscriber ID | NMSS Screening Rule ID | Day of Week | Time of Day | Is Rule Active? |
|---|---|---|---|---|
| 9193803814 | 1 | * | * | Yes |
| 9193803814 | 2 | Weekend | * | No |
| Pete@Tekelec.com | 1 | * | 5pm - 8am | Yes |

| Called Subscriber ID | NMSS Screening Rule ID | Blocked Calling Subscribers | Blocked Media Type |
|---|---|---|---|
| 9193803814 | 1 | 9194938000 | audio |
| 9193803814 | 1 | 9194605500 | audio |
| 9193803814 | 2 | 800* | * |
| Pete@Tekelec.com | 1 | Joe@Cisco.com | video |
| Pete@Tekelec.com | 1 | Bob@Cisco.com | audio |

FIG. 10

Exemplary "Whitelist" NMSS Data Structure

| Called Subscriber ID | NMSS Screening Rule ID | Day of Week | Time of Day | Is Rule Active? |
|---|---|---|---|---|
| 9193803814 | 1 | * | * | Yes |
| 9193803814 | 2 | Weekend | * | No |
| Pete@Tekelec.com | 1 | * | 5pm - 8am | Yes |

| Called Subscriber ID | NMSS Screening Rule ID | Allowed Calling Subscribers | Allowed Media Type |
|---|---|---|---|
| 9193803814 | 1 | 9194938000 | audio |
| 9193803814 | 1 | 9194605500 | audio |
| 9193803814 | 2 | 800* | * |
| Pete@Tekelec.com | 1 | Joe@Cisco.com | video |
| Pete@Tekelec.com | 1 | Bob@Cisco.com | audio |

FIG. 11

Exemplary NMSS Data Structure w/Call Forward Override (CFO) Data

| Called Subscriber ID | CFO Rule ID | Day of Week | Time of Day | Is Rule Active? |
|---|---|---|---|---|
| 9193803814 | 1 | * | * | Yes |
| Pete@Tekelec.com | 1 | * | 5pm - 8am | Yes |

| Called Subscriber ID | CFO Rule ID | Calling Subscriber | Media Type | Redirect Address |
|---|---|---|---|---|
| 9193803814 | 1 | 9194938000 | audio | 9194938001 |
| 9193803814 | 1 | 9194605500 | audio | 9194938001 |
| Pete@Tekelec.com | 1 | Joe@Cisco.com | video | PeteHome@VZW.com |
| Pete@Tekelec.com | 1 | Bob@Cisco.com | audio | 9195551451 |

FIG. 12

METHODS, SYSTEMS, AND COMPUTER PROGRAM PRODUCTS FOR PERFORMING MESSAGE DEPOSIT TRANSACTION SCREENING

RELATED APPLICATIONS

The presently disclosed subject matter claims the benefit of U.S. Provisional Patent Application Ser. No. 60/964,335, filed Aug. 10, 2007; the disclosure of which is incorporated herein by reference in its entirety.

TECHNICAL FIELD

The subject matter described herein relates to message deposit transactions. More particularly, the subject matter described herein relates to methods, systems, and computer program products for performing message deposit transaction screening.

BACKGROUND

Conventional message screening systems, such as voicemail, videomail, and multimedia message mail screening systems, do not provide end-users or network operators with the ability to prevent message deposits from being performed. As a result, message servers are open to becoming spam receptacles. In one example, a calling party may initiate a call to a called party who is unavailable to answer the call. In a SIP scenario, the called party terminal may then generate a message indicating that he is unavailable to answer, such as a 486 Busy message. This message may be received by the switch attempting to connect the call, and upon determining that the calling party is unavailable, the call attempt may be converted into a voicemail deposit attempt. In a voicemail deposit attempt, the calling party may attempt to leave a voicemail message for the called party. In order to initiate a message deposit transaction, the switch may determine an appropriate message server associated with the called party and route the call to the determined message server. Once connected to the message server, a message deposit may be performed.

While conventional methods may exist for screening which messages are listened to by a subscriber, the message screening criteria is typically applied after the message deposit transaction has been completed and a message has been stored. Therefore, while conventional message systems may provide users with the ability to screen the messages they listen to, conventional message systems do not provide operators with the ability to screen message deposit transactions before unwanted messages are deposited. Accordingly, conventional message systems may expend unnecessary message resources in order to perform unwanted message deposit transactions and store unwanted messages. In addition, as described above, message storage such as voicemail, videomail, and multimedia mail mailboxes may become repositories for unwanted or spam messages.

Accordingly, in light of these difficulties, there exists a need for methods, systems, and computer program products for performing voicemail deposit transaction screening.

SUMMARY

The subject matter described herein includes methods, systems, and computer program products for performing message deposit transaction screening. One method includes receiving a call setup signaling message for a call for which a message deposit transaction is indicated and determining a message deposit transaction parameter associated with the message deposit transaction based on the signaling message. At least one screening criterion is determined for the message deposit transaction based on the at least one message deposit transaction parameter. A voicemail deposit transaction screening action is performed based on application of the screening criterion to the message deposit transaction parameter.

According to another aspect of the subject matter described herein, a system for screening message deposit transactions is provided. The system includes a message deposit screening rules database for storing at least one message deposit transaction screening criterion, wherein the at least one screening criterion is associated with at least one message deposit transaction parameter. A message deposit transaction screening function is communicatively coupled to the message screening rules database and is configured to receive at least one signaling message for a call for which a message deposit transaction is indicated. The message deposit transaction screening function determines at least one message deposit transaction parameter associated with the message deposit transaction based on the signaling message and determines at least one screening criterion for the message deposit transaction using the at least one message deposit transaction parameter. The message deposit screening function performs a message deposit transaction screening action based on the application of the screening criterion to the message deposit transaction parameter.

The subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In one implementation, the computer readable medium may include a memory accessible by a processor. The memory may include instructions executable by the processor for implementing any of the methods for providing voicemail deposit transaction screening described herein. In addition, a computer-readable medium that implements the subject matter described herein may be located on a single device or computing platform or may be distributed across multiple physical devices and/or computing platforms.

BRIEF DESCRIPTION OF THE DRAWINGS

Preferred embodiments of the subject matter described herein will now be explained with reference to the accompanying drawings of which:

FIG. 10 is a diagram of an exemplary data structure for providing network based message deposit transaction screening including a blacklist functionality according to an embodiment of the subject matter described herein;

FIG. 11 is a diagram of an exemplary data structure for providing network based message deposit transaction screening including a whitelist functionality according to an embodiment of the subject matter described herein;

FIG. 12 is a diagram of an exemplary data structure for providing network based message deposit transaction screening including call forward override functionality according to an embodiment of the subject matter described herein.

DETAILED DESCRIPTION

In view of the problems described above with respect to performing conventional message screening, the subject matter described herein provides for message deposit transaction screening. Where previously conventional systems did not allow for screening messages before they were deposited, resulting in wasted message system resources associated with performing unwanted message deposit transactions and storing unwanted messages, the subject matter described herein provides for screening message deposit transactions before they are completed. By screening message deposit transactions before they are completed, waste of message system resources is reduced. Message deposit transaction setup screening may be implemented in a communications network including at least one message server, as will be described in more detail below. It will be appreciated that, as used herein, the term voicemail may also broadly refer to voice/audio mail, video mail, text mail, and multimedia mail messages. In addition, the term message deposit transaction, as used herein, may include one of a voicemail, videomail, or multimedia mail message deposit transaction which is further converted/translated into an email message for delivery to a subscriber without departing from the scope of the subject matter described herein.

Figure 1:
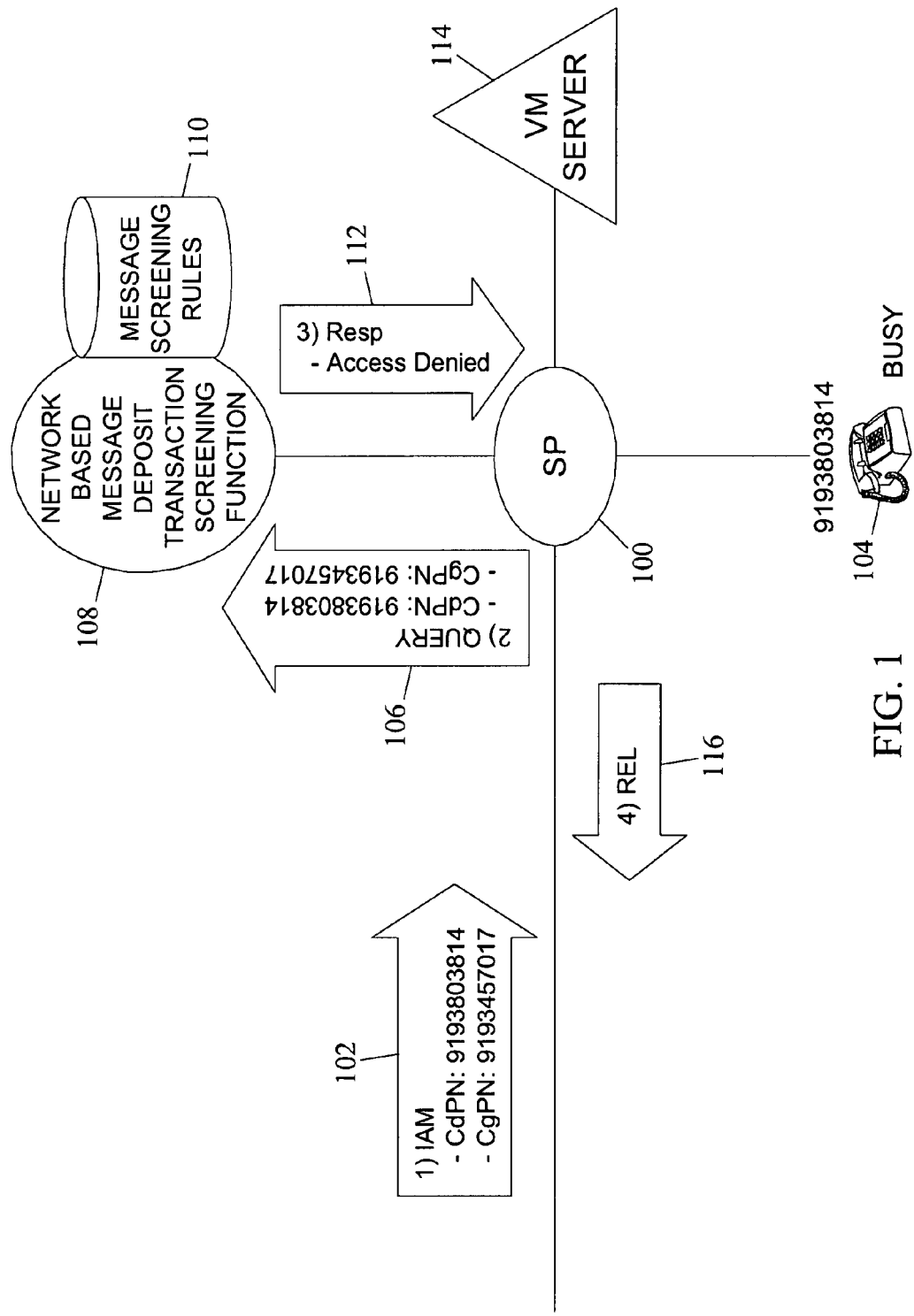
FIG. 1 is a diagram of an exemplary SS7 network for providing message deposit transaction screening according to an embodiment of the subject matter described herein.

FIG. 1 is a diagram of an exemplary SS7 network for performing voicemail deposit transaction screening according to an embodiment of the subject matter described herein. Referring to FIG. 1, the exemplary SS7 network may include a switching point (SP) for receiving SS7 signaling messages associated with an attempted call transaction, determining that the called party is unavailable, and attempting to perform a voicemail deposit transaction. SP 100 may be a public switched telephone network (PSTN) end office (EO), a mobile switching center (MSC), a media gateway controller (MGC), a softswitch (SS), or any other suitable network node. With respect to SS7 implementations, it will be appreciated that call signaling messages may include SS7-over-IP signaling messages, such as Internet Engineering Task Force (IETF) SIGTRAN signaling messages.

SP 100 may receive an ISDN user part (ISUP) initial address message (IAM) message associated with an attempted call transaction that includes a called party identifier and a calling party identifier, such as a called party number (CdPN) and a calling party number (CgPN). For example, SP 100 may receive IAM 102 including CdPN 9193803814 associated with called party 104 and CgPN 9193457017 associated with calling party (not shown). SP 100 may then attempt to connect the call to called party 104. However, in this example, called party 104 is unavailable (i.e. busy, no answer etc.) and a corresponding signal may be returned to SP 100 indicating that called party 104 is unavailable. Once SP 100 determines that called party 104 is unavailable, SP 100 would normally route the call to message server 114.

However, before routing the transaction to message server 114, SP 100 may first query message deposit transaction screening function 108 in order to determine whether the attempted message deposit transaction is allowed. For example, SP 100 may generate and send transaction capability application part (TCAP) query message 106 to network based message deposit transaction screening function (MDTSF) 108 that includes CdPN 9193803814 and CgPN 9193457017 included in IAM 102. Query 106 may then be sent to MDTSF 108 for determining whether access to message server 114 should be allowed or denied. In one embodiment, MDTSF 108 may communicate with message screening rules database 110 that include one or more screening criterion associated with at least one message deposit transaction parameter included in query 106. Message screening rules 110 may include a blacklist, a whitelist, or any other suitable data structure for screening message deposit transactions without departing from the subject matter described herein.

In this example, MDTSF 108 may receive and process query message 106 using the CdPN and CgPN identifier information. It is appreciated that in addition to the TCAP query protocol described above, other suitable SS7 or non-SS7 protocols may be used without departing from the scope of the subject matter described herein. For example, session initiation protocol (SIP), simple object access protocol (SOAP), or extensible markup language (XML) may be used to access MDTSF 108. Upon determining that a message deposit transaction is not allowed according to message screening rules 110, screening function 108 may generate and return response message 112 to SP 100 indicating that access to message server 114 is denied. In response to receiving response message 112 from MDTSF function 108, SP 100 may end the call. For example, SP 100 may generate an ISUP release (REL) message 116 and transmit REL message 116 to the originator of ISUP IAM 102.

In an alternate embodiment, MDTSF 108 may be co-located with an advanced message routing function. An advanced message routing function is described in commonly assigned, co-pending U.S. patent application Ser. No. 11/891,667, the disclosure of which is incorporated herein by reference in its entirety. It is appreciated that the advanced message routing function described in application Ser. No. 11/891,667 may provide for determining a message server associated with the attempted message deposit transaction from among a plurality of message servers based on a received message routing query. Therefore, in this alternate embodiment, query 106 may also include information associated with an advanced message routing request. However, query 106 may initially be processed by screening function 108 and access may be denied for the attempted message deposit transaction before it is processed by the advanced message routing function, thereby avoiding the wasting of message system resources. Alternatively, if screening function 108 determines that the message deposit transaction was allowed, advanced message routing function may be invoked to determine the proper message server that is associated with the message deposit transaction.

In another embodiment, message deposit transaction screening may be performed internally at a softswitch or other suitable network node without querying an external message screening rules database. Thus, a softswitch may be configured to receive a signaling message for a call for which a message deposit transaction is indicated, and, utilizing a message deposit transaction screening function, determine whether the message deposit transaction is allowed. If the message deposit transaction is not allowed, the softswitch may prevent the message deposit transaction from being completed.

Figure 2:
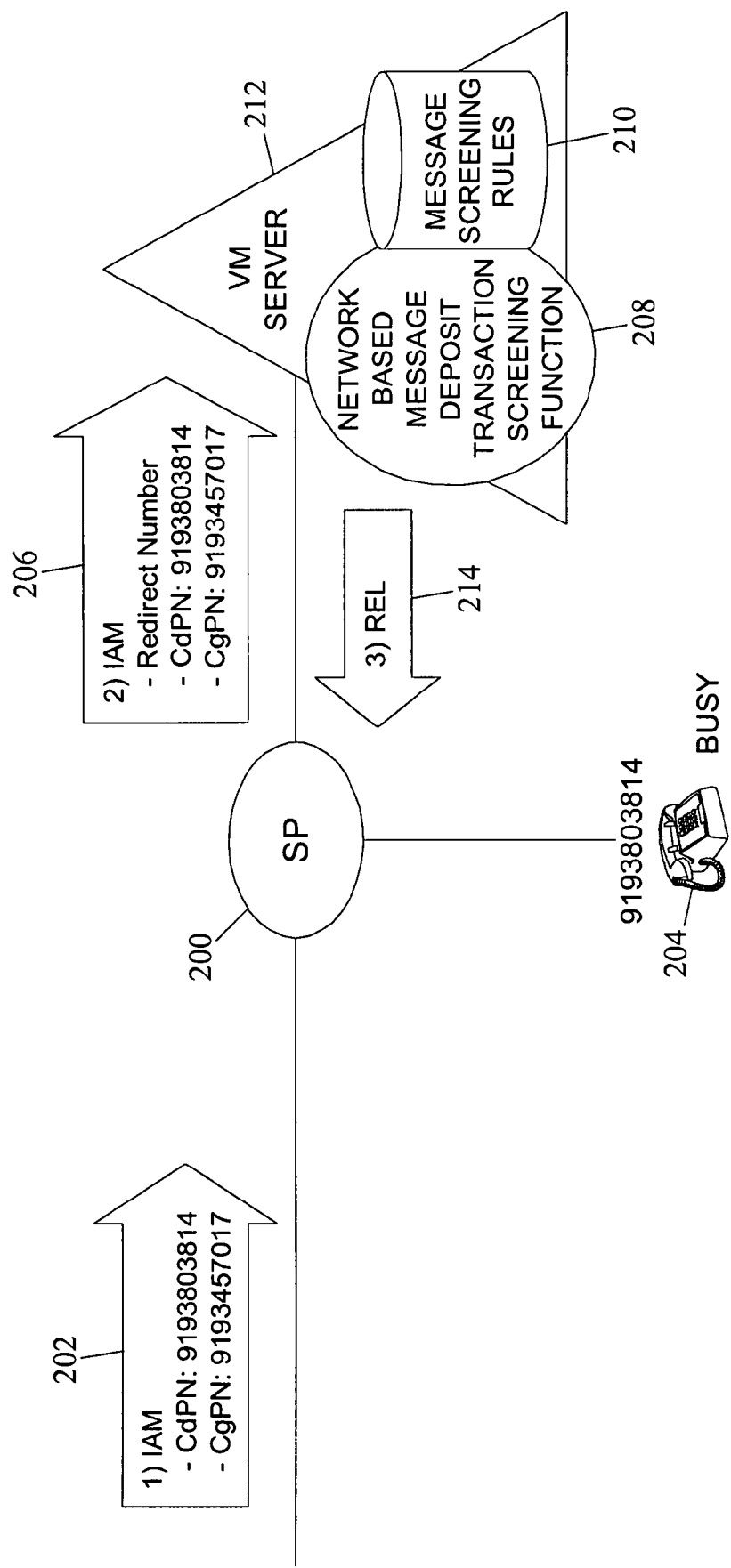
FIG. 2 is a diagram of an exemplary SS7 network for providing message deposit transaction screening according to an embodiment of the subject matter described herein.

FIG. 2 is a diagram of an exemplary SS7 network for performing message deposit transaction screening at a message server according to an embodiment of the subject matter described herein. Unlike conventional message screening systems, the implementation illustrated in FIG. 2 screens message deposit transaction before allowing messages to be deposited with the message server. Referring to FIG. 2, switching point (SP) 200 may receive ISUP IAM message 202 including CdPN and CgPN identifiers 9193803814 and 9193457017, respectively. Upon receiving IAM 202, SP 200 may determine that called party 204 associated with CdPN 9193803814 is busy (or unavailable, e.g., no answer). In response to determining that the call cannot be completed, a message deposit transaction may be initiated. For example, SP 200 may modify IAM 206 to include a message server identifier and may route IAM 206 to message server 212. Therefore, this embodiment does not require modification to the conventional operation of SP 200. Rather, SP 200 modifies and redirects received IAM messages for attempted message deposit transactions.

However, in this embodiment, MDTSF function 208 may be co-located on, or integrated with, message server 212 and may be configured to intercept IAM message 206 before a message deposit transaction may be completed with message server 212. Specifically, MDTSF 208 may use one or more message deposit transaction parameters extracted from IAM 206, including the CdPN and the CgPN, to search message screening rules database 210 in order to determine whether the message deposit transaction should be allowed. In this example, the message deposit transaction is denied and MDTSF 208 sends a Release (REL) message to SP 200.

Figure 3:
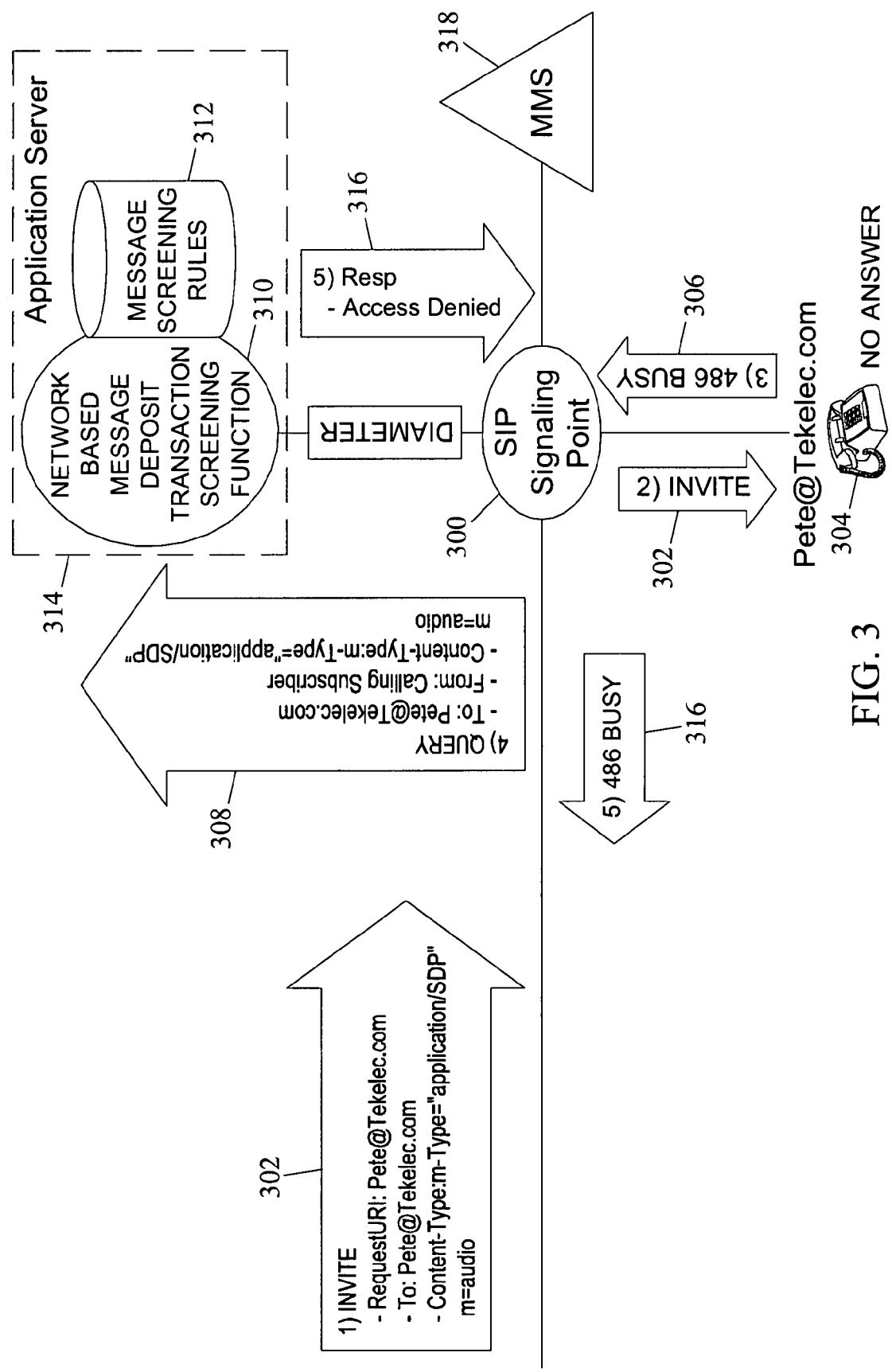
FIG. 3 is a diagram of an exemplary SIP network for providing message deposit transaction screening according to an embodiment of the subject matter described herein.

FIG. 3 is a diagram of an exemplary SIP MDTSF configured to operate in a query/response mode according to an embodiment of the subject matter described herein. Referring to FIG. 3, signaling point 300 may include any suitable packet network-based signaling point, including but not limited to an Internet multimedia subsystem (IMS) call session control function (CSCF), a session initiation protocol (SIP) proxy, a media gateway controller (MGC), or a softswitch. SIP SP 300 may be configured to receive a SIP INVITE message, such as INVITE message 302, requesting a voice transaction. A voice transaction may be determined, for example, if INVITE message 302 includes an SDP payload that identifies the requested media type as "audio". SIP signaling point 300 may attempt to complete the call to SIP endpoint 304 by forwarding INVITE message 302 to subscriber 304. In this example, user 304 is busy and therefore may return a 486 Busy message 306 to SIP signaling point 300.

In response to determining that user 304 is busy (i.e. receiving busy message 306), SIP signaling point 300 may formulate a MDTSF query message directed to MDTSF 310. For example, query 308 may include a "To" parameter indicating user 304, a "From" parameter indicating the calling subscriber, and media type value. It is appreciated that while query 308 shown in FIG. 3 is a DIAMETER query, query 308 may be transmitted using an suitable networking protocol without departing from the scope of the subject matter described herein.

Based on the message deposit transaction parameters contained in query 308, MDTSF function 310 may determine whether to allow or disallow the message deposit transaction. For example, MDTSF 310 may search message screening rules database 312 solely based on the From field extracted from query 308 or, alternatively, may search message screening rules 312 based on multiple message deposit transaction parameters. These additional message deposit transaction parameters may include, but are not limited to, media type and timestamp information.

In this embodiment, MDTSF function 310 may be located at a SIP application server (AS), such as a SIP AS 314. In other embodiments, MDTSF 310 may be located at or integrated with an IP multimedia subsystem (IMS) AS or next generation network (NGN) AS. After determining one or more screening criterion for the attempted message deposit transaction, MDTSF 310 may generate and return response message 316 indicating whether the message deposit transaction is allowed. For example, response message 316 may be sent to SIP signaling point 300 and 486 Busy message 316 may be returned to the calling subscriber.

Figure 4:
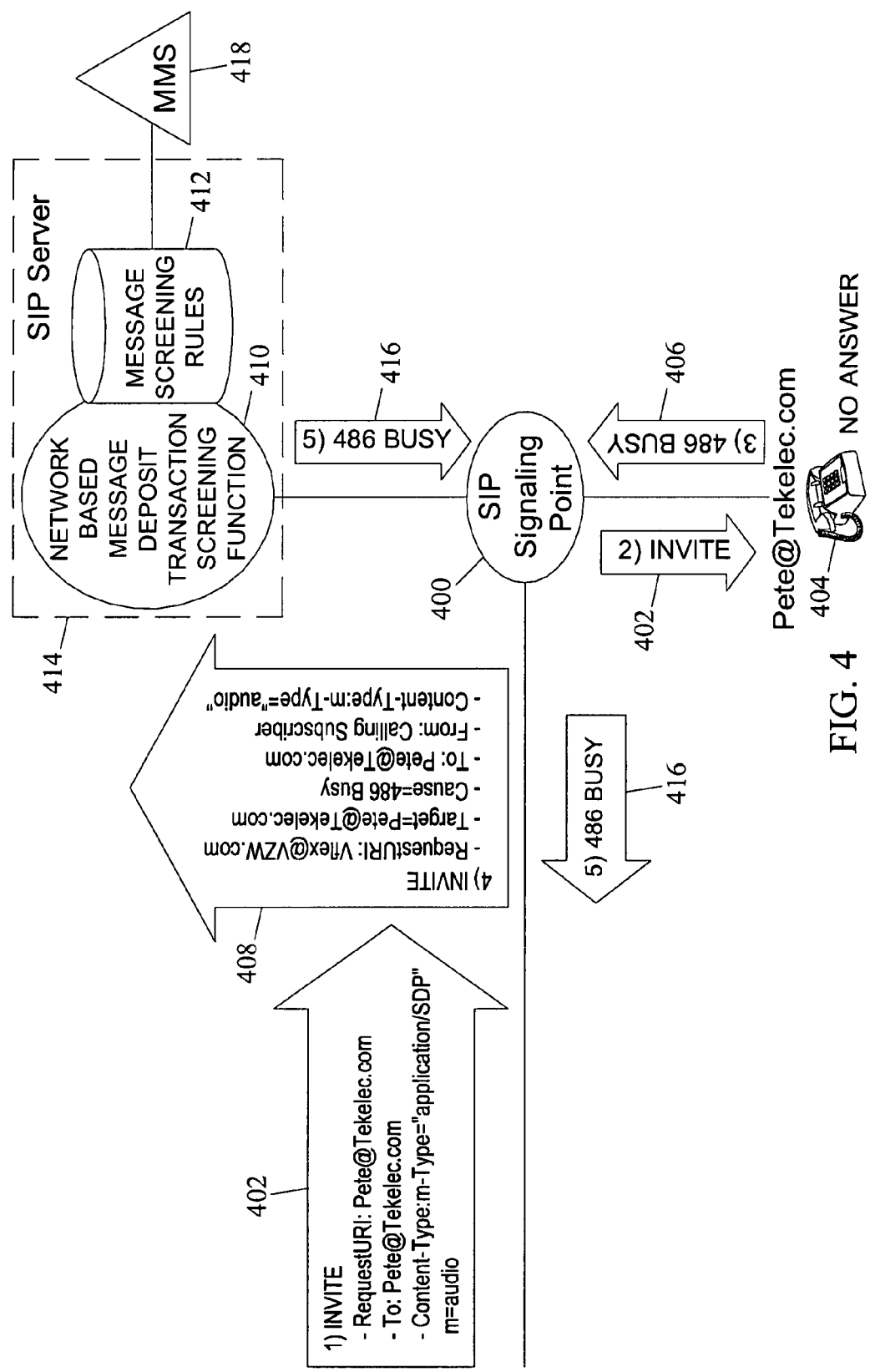
FIG. 4 is a diagram of an exemplary SIP network for providing network based message deposit transaction screening according to an embodiment of the subject matter described herein.

FIG. 4 is a diagram of an exemplary SIP network including a stand-alone message deposit transaction screening function and illustrating exemplary messages for providing network based message deposit transaction screening according to an embodiment of the subject matter described herein. In FIG. 4, multimedia message server (MMS) 418 may be communicatively coupled to SIP AS 414. In addition, SIP AS 414 is in the call path. Therefore, in this embodiment, the need for a query and response mechanism between SIP signaling point 400 and MDTSF 410 is eliminated.

Referring to FIG. 4, SIP signaling point 400 may be configured to modify SIP INVITE message 402 and relay the modified message 408 to MDTSF 410. For example, SIP signaling point 400 may modify INVITE message 402 to include a "Target" parameter, a "From" subscriber parameter, a media type parameter, and a "Cause" parameter within a header format such as the one described in IETF RFC 4458, the disclosure of which is incorporated herein by reference in its entirety.

Upon receiving INVITE message 408, MDTSF function 410 may apply one or more screening criteria to the attempted message deposit transaction. In this example, it is assumed that, based on the applied screening criteria, the message deposit transaction is not allowed. Accordingly, MDTSF function 410 may return generate SIP message 416 including a 486 Busy cause code to SIP signaling point 400. SIP signaling point 400 may relay 486 Busy message 416 to SIP signaling point 400 in order to terminate the transaction. Alternately, if message screening rules 412 indicate that the message deposit transaction was allowed, INVITE message 408 may be forwarded by SIP server 414 to MMS 418 for completing the desired transaction.

In addition to applying screening criteria to a message deposit transaction, MDTSF 410 may be configured to maintain statistics, call detail records, and/or transaction detail records associated with actions taken by MDTSF 410, including denial and allowance of message deposit transactions. These records may also be provided to subscribers or network operators without departing from the scope of the subject matter described herein.

Figure 5:
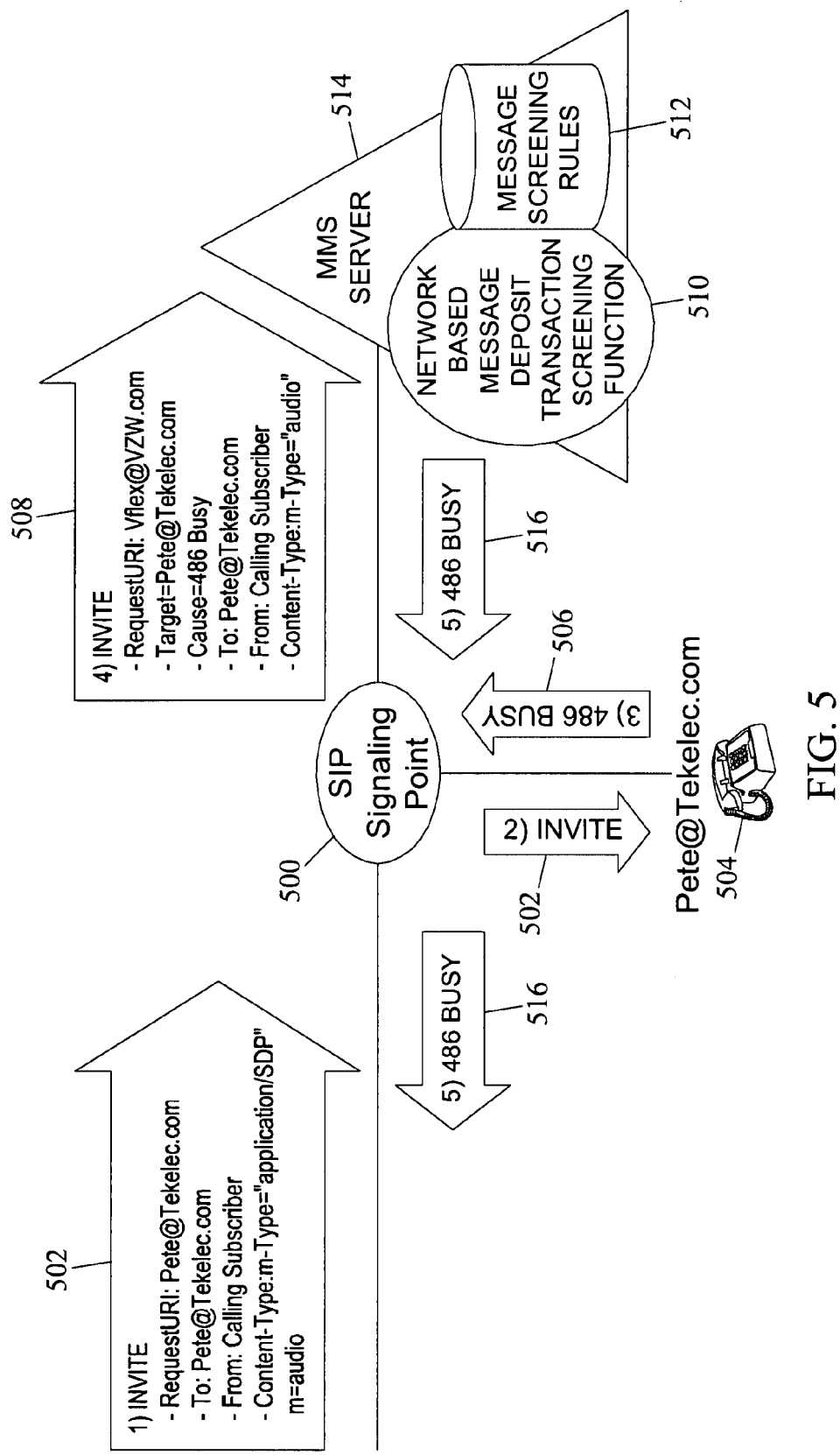
FIG. 5 is a diagram of an exemplary SIP network for providing network based message deposit transaction screening according to an embodiment of the subject matter described herein.

FIG. 5 is a diagram of an exemplary SIP network including a message deposit transaction screening function co-located or in an MMS server and illustrating exemplary messages for providing network based video/voice/multimedia message deposit transaction screening according embodiment of the subject matter described herein. In FIG. 5, MDTSF 510 may be implemented in a "relay" mode. In the relay mode, SIP signaling point 500 may be configured to relay modified SIP messages associated with a message deposit transaction to an MMS server for processing without generating a separate query to MDTSF 510.

Referring to the embodiment illustrated in FIG. 5, SIP signaling point 500 may receive SIP INVITE message 502 directed to destination subscriber 504. SIP signaling point 500 may forward INVITE message 502 to subscriber 504. However, it is assumed that subscriber 504 is unavailable to complete the call and therefore returns a 486 Busy message 506 to SIP SP 500. SIP SP 500 may modify SIP INVITE message 502 to include one or more message deposit transaction parameters, such as a "Target" parameter, a "Cause" parameter, a "From" parameter, and a media type parameter, in order to generate SIP INVITE message 508, which is forwarded to MMS 514. Using at least a portion of the message deposit transaction parameters included in SIP INVITE message 508, MDTSF 510 may apply one or more screening criteria to the message deposit transaction. In the example shown, the message deposit transaction is not allowed and MDTSF 510 returns SIP 486 Busy message 516 to SIP signaling point 500 or, alternately, to the calling subscriber.

As stated above with respect to FIG. 4, statistics, call detail records, and/or transaction detail records associated with MDTSF denial/allowance actions may be maintained by MDTSF 510 and provided to subscribers or network operators without departing from the scope of the subject matter described herein.

Figure 6:
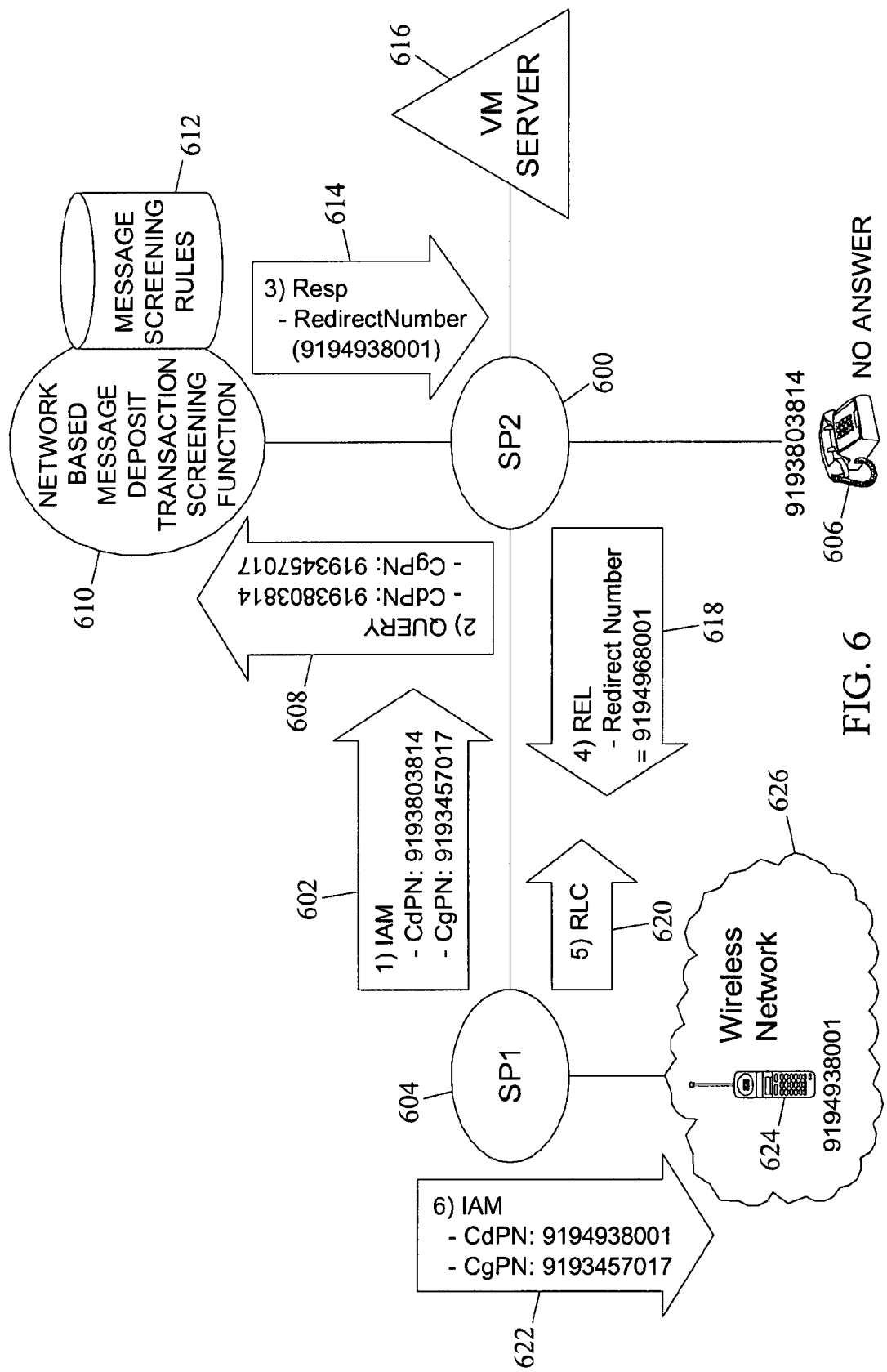
FIG. 6 is a diagram of an exemplary SS7 network for providing network based message deposit transaction screening and selective call forwarding according to an embodiment of the subject matter described herein.

FIG. 6 is a diagram of an exemplary SS7 network for providing network based message deposit transaction screening and selective call forwarding according to an embodiment of the subject matter described herein. Referring to FIG. 6, message screening rules database 612 may provide for the selective forwarding of message deposit transactions to a CdPN number other than the original CdPN. In the embodiment illustrated in FIG. 6, switching point (SP2) 600 may receive ISUP IAM message 602 from SP1 604 that includes a first CdPN identifier and CgPN identifier. In response to receiving IAM 602, SP2 600 may attempt to complete the call to subscriber 606. However, it is determined that called party 606 is unavailable (e.g., no answer, busy, etc.).

In response to determining that called party 606 is unavailable, SP2 600 may generate query message 608 directed to MDTSF 610, such as a TCAP query message. Query message 608 may include CdPN and CgPN identifiers included in IAM 602, and may be used to search message screening rules database 612. In addition to the allow/disallow screening rules described above, message screening rules 612 may also provide for forwarding the attempted transaction to an alternate CdPN. For example, MDTSF 610 may determine that subscriber 606 associated with CdPN identifier 9193803814 would like the call to be forwarded to another called party identifier (e.g., POTS identifier, mobile service subscriber identifier (MSISDN, MIN, etc.), uniform resource identifier (URI), Internet protocol (IP) address, etc.). In such a case, MDTSF 610 is adapted to return a call forward/redirection address identifier to the querying SP2 600 in response message 614.

In response to receiving response message 614, SP2 600 may generate ISUP REL message 618 and transmit REL message 618 to the originator of the ISUP IAM (i.e SP1 604). SP1 604 may then generate and send a RELEASE COMPLETE (RLC) message 620 to SP2 600. Thus, message screening rules 612 may provide for ensuring that even if a calling subscriber would otherwise be permitted to deposit a voice mail/video mail message, MDTSF function 610 may determine that the call should be instead forwarded/redirected.

Figure 7:
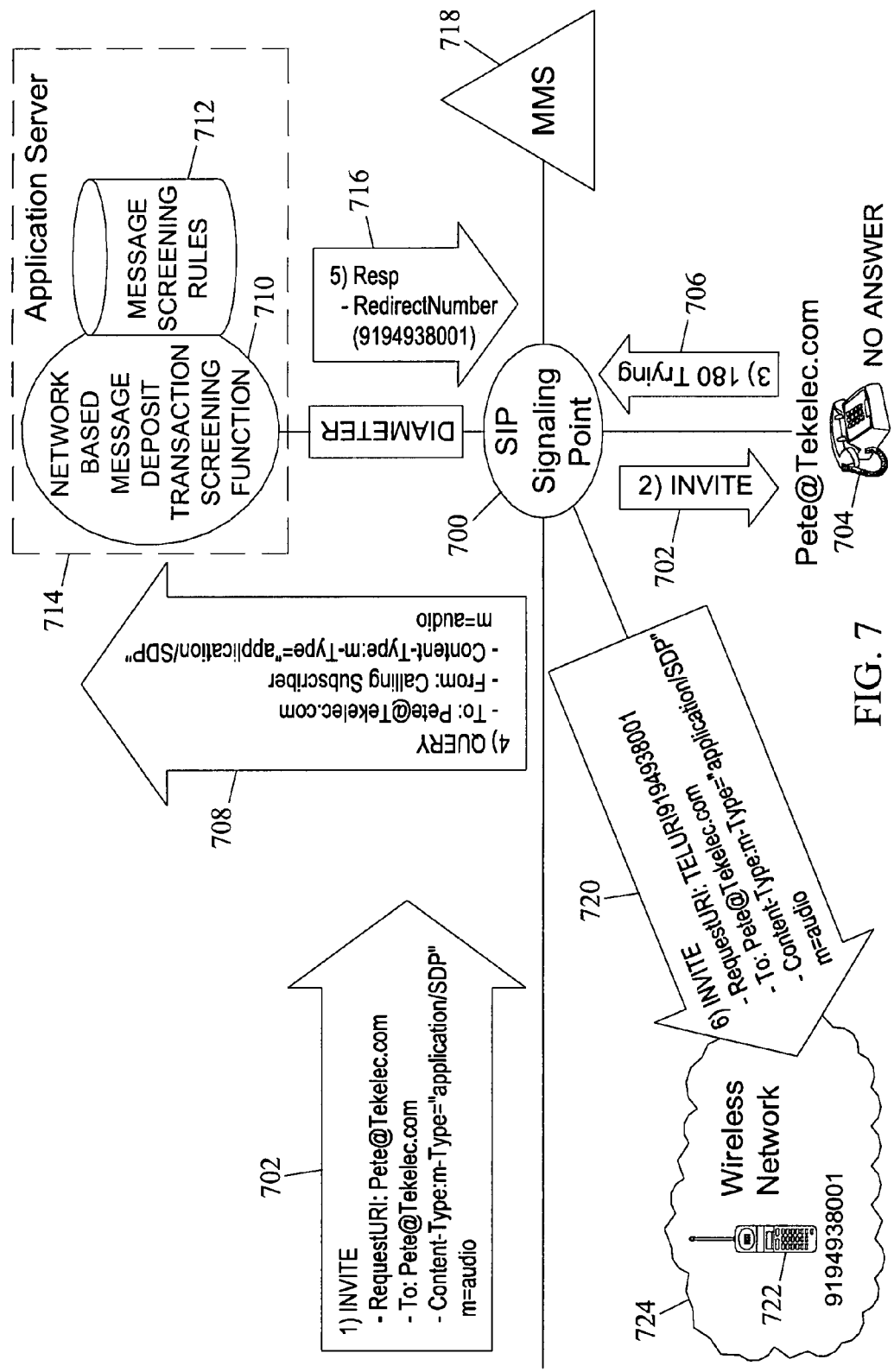
FIG. 7 is a diagram of an exemplary SS7 network for providing network based message deposit transaction screening and selective call forwarding according to an embodiment of the subject matter described herein.

FIG. 7 is a diagram of an exemplary SS7 network for providing network based message deposit transaction screening and selective call forwarding according to an embodiment of the subject matter described herein. Referring to FIG. 7, SIP signaling point 700 may be configured to receive SIP INVITE message 702 requesting a voice transaction. SIP signaling point 700 may then attempt to complete the call to called SIP endpoint 704. However, in this example, called SIP endpoint 704 may respond by generating and sending message 706 including Cause code "180 Trying." In response, SIP signaling point 700 may formulate query message 708 directed to MDTSF 710 that includes information included in SIP message 706. In the example shown in FIG. 7, MDTSF query message 708 includes the calling or "From" parameter value, the called or "To" parameter value, the media type value, and a cause code value. Based at least on the calling party/"From" subscriber identifier and called party/"To" subscriber identifier MDTSF 710 may determine whether the attempted message deposit transaction is allowed. In other embodiments, MDTSF query 708 may include information which identifies the media type of the call, and the media type information may be used in conjunction with the To & From identifier information to determine whether the calling party/From subscriber is permitted to deposit a message in the voicemail/multimedia mail/video mail system.

If the result of the screening determination made by MDTSF 710 as described above indicates that the calling subscriber is permitted to deposit a message, MDTSF 710 may further be configured to determine whether the call should be forwarded to another called subscriber identifier, such as a mobile number. In this example, MDTSF 710 may determine that the call should be forwarded to TELURI 9194938001. Accordingly, MDTSF 710 may generate and send response message 716 to SIP signaling point 700, which in turn may generate new SIP INVITE message 720 addressed to TELURI 9194938001. Thus, the embodiment in FIG. 7 provides for greater granularity in the number of actions that may be taken regarding a message transaction based on message screening/selective call forwarding rules provided by called subscriber 704. Specifically, called subscriber 704 may prefer for calls from a particular calling subscriber to be redirected to a secondary called subscriber identifier rather than simply blocked or allowed.

It is appreciated that while MDTSF function 710 is associated with an application server (AS) in the embodiment shown in FIG. 7, MDTSF 710 may also be co-located at or integrated with SIP signaling point 700, or any other suitable network element.

Figure 8:
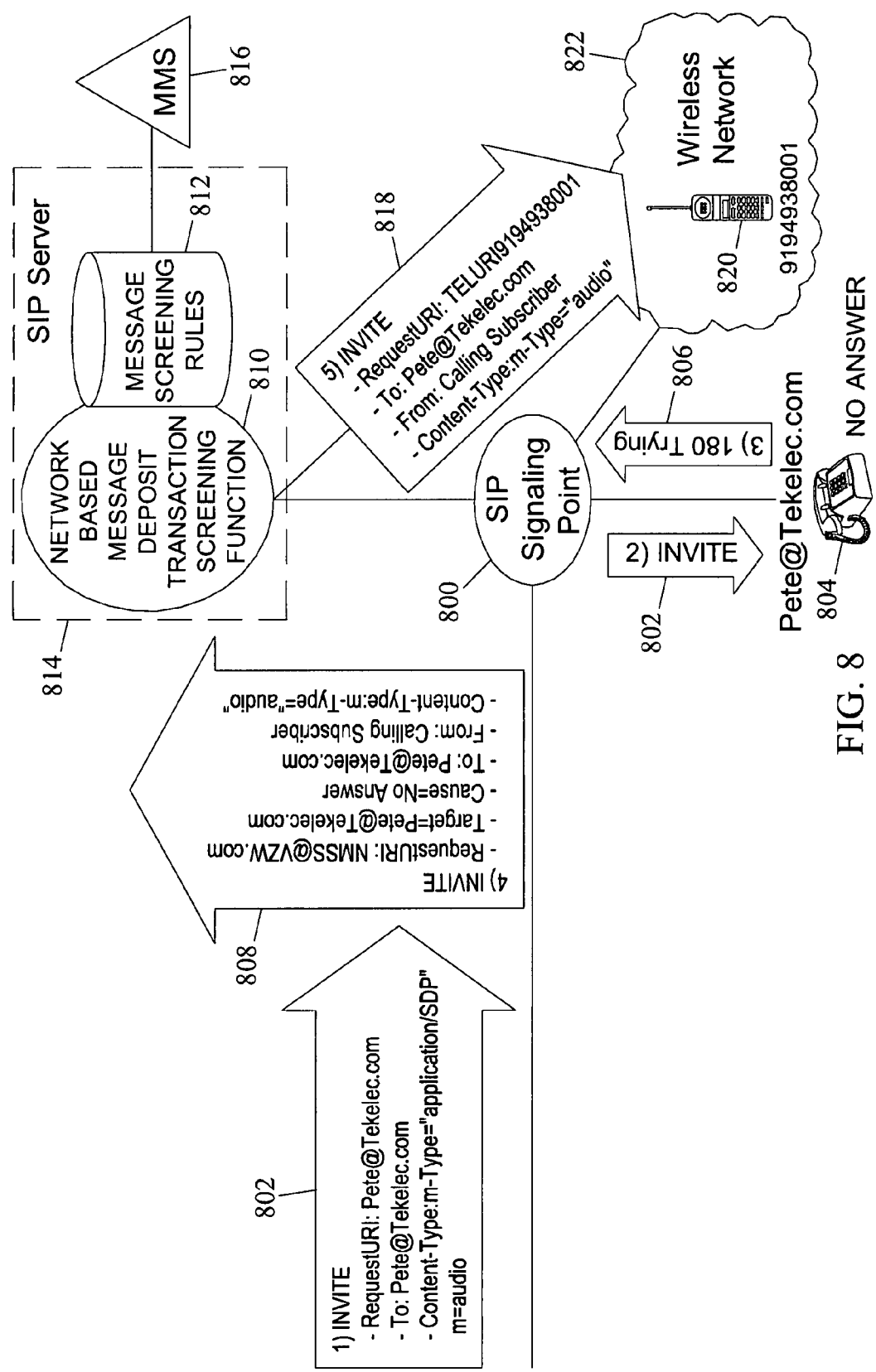
FIG. 8 is a diagram of an exemplary SIP network for providing network based message deposit transaction screening and selective call forwarding according to an embodiment of the subject matter described herein.

FIG. 8 is a diagram of an exemplary SIP network for providing network based message deposit transaction screening and selective call forwarding according to an embodiment of the subject matter described herein. Referring to FIG. 8, MDTSF 810 may be implemented in a "relay" mode, wherein SIP signaling point is configured to forward SIP INVITE message 808 to MDTSF 810 rather than generating a query and awaiting a response. In this embodiment, MDTSF 810 may be associated with a network element, such as a SIP server, an application server, or a SIP router. In alternate embodiments, INVITE message 808 may be addressed to voice mail/multimedia mail server 816 and MDTSF 810 may be configured to intercept the INVITE message.

In the example shown, SIP signaling point 800 may determine that called subscriber 804 does not answer and may be configured to modify SIP INVITE 802. SIP signaling point 800 may modify the INVITE so as to redirect the call/INVITE message to MDTSF 810. In this example the SIP message is redirected to a RequestURI associated with MDTSF 810 (i.e., MDTSF@VZW.com).

In this embodiment, even if the calling subscriber is permitted to deposit a voice mail/video mail message, the MDTSF may be configured to first determine whether the called subscriber would prefer for the call to be forwarded/redirected to another called subscriber identifier. In this example, MDTSF 810 may determine that the call should be forwarded to TELURI 9194938001. This call forwarding/redirection information is incorporated in the SIP INVITE message (or a new INVITE message, based on the received INVITE message is generated), and the modified message is communicated to the call forward/redirection address.

As described above with respect to FIGS. 4 and 5, statistics or call/transaction detail records associated with MDTSF denial/allowance/call forward-redirection actions may be maintained by the MDTSF function and subsequently provided to/accessed by subscribers or network operators without departing from the scope of the subject matter described herein.

Figure 9:
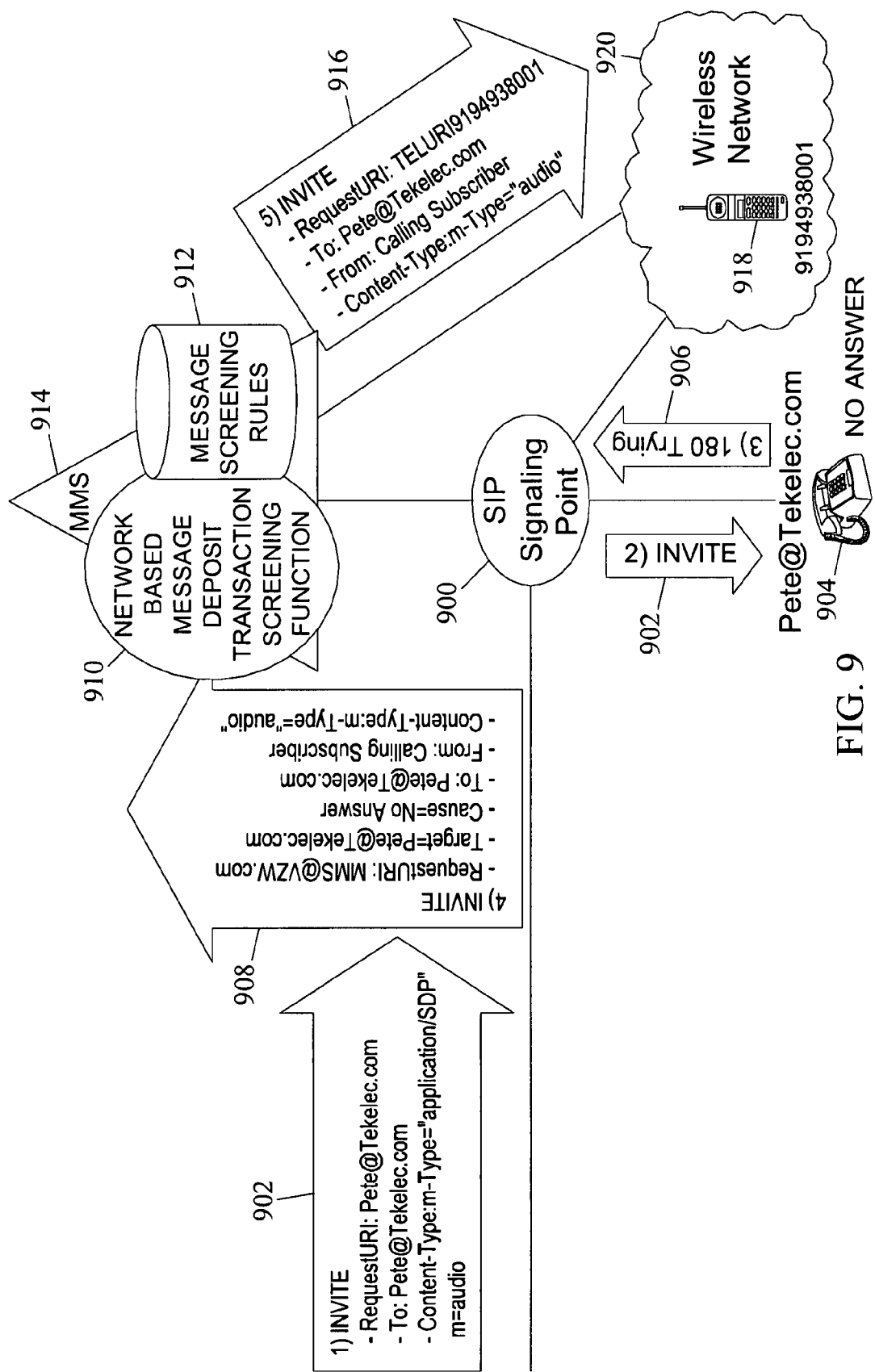
FIG. 9 is a diagram of an exemplary SIP network for providing network based message deposit transaction screening and selective call forwarding according to an embodiment of the subject matter described herein.

FIG. 9 is a diagram of an exemplary SIP network for providing network based message deposit transaction screening and selective call forwarding according to an embodiment of the subject matter described herein. Referring to FIG. 9, MDTSF 910 may be co-located at or integrated with MMS 914. As such, SIP signaling point 900 may redirect SIP INVITE message 902 to MMS 914, where they may be initially processed by MDTSF 910.

As stated above with respect to FIGS. 4, 5, and 8, INVITE message 908 may include one or more parameters that may be used in conjunction with message screening rules database 912 to apply one or more screening criterion on the attempted message deposit transaction. In this example, application of the one or more screening criterion may result in a determination to redirect the transaction to an alternate called party identifier. For example, MDTSF 910 may modify INVITE message 908 to include RequestURI=TELURI9194938001 in order to generate INVITE message 916 and forward INVITE message 916 to wireless device 918 within wireless network 920 associated with TELURI9194938001.

FIG. 10 is a diagram of an exemplary data structure for providing network based message deposit transaction screening according to an embodiment of the subject matter described herein. Specifically, FIG. 10 illustrates exemplary "Blacklist" screening rules that may be applied to attempted message deposit transactions. Referring to FIG. 10, exemplary blacklist screening rules data structures 1000 and 1002 may include tables indexed by called subscriber IDs. In table 1000, column 1004 may contain one or more called subscriber IDs, including but not limited to one or more URIs or CdPNs. Column 1006 includes MDTSF screening rule IDs, where the MDTSF screening rule ID is used for differentiating between multiple screening rules associated with a single called subscriber ID in column 1004. Columns 1008 and 1010 may include "day of week" and "time of day" information for specifying a time period during which attempted message deposit transactions to the called subscriber are to be blocked. Column 1012 may include a message screening rule status indicator for indicating whether the exemplary blacklist screening rules stored in columns 1006-1010 are to be applied.

In exemplary message screening rules table 1002, columns 1014 and 1016 may include one or more called subscriber IDs and MDTSF screening rule IDs, respectively. However, rather than screening attempted message deposit transactions based on time information as illustrated in table 1000, screening rules table 1002 provides for screening message deposit transactions from specific calling subscribers and/or media types based on the list of blocked calling subscribers and blocked media types listed in columns 1018 and 1020, respectively.

For example, a calling subscriber associated with calling subscriber ID 9194938000 may attempt to call a called subscriber associated with 9193803814 who is unavailable to answer the call. Accordingly, a query may be generated and sent (or a signaling message may be forwarded) to a MDTSF for applying one or more screening criteria located in table 1002. Based on a search of column 1014 for called subscriber ID 9193803814 and column 1018 for calling subscriber ID 9194938000, the second row in table 1002 may indicate that an attempted audio message deposit transaction is not allowed. MDTSF may then terminate or otherwise indicate that access to a message server associated with the called subscriber is denied.

In one embodiment, message deposit transaction screening rules 1000 and 1002 may be provisioned by a network operator through a provisioning interface. In another embodiment, message deposit transaction screening rules 1000 and 1002 may be provisioned by a communications service subscriber via a GUI or Web interface. In yet another embodiment, a communications service subscriber may provision screening rules via a message service-based interface, such as a short message service (SMS) interface. For example, a subscriber may generate and send an SMS message to a short code associated with a screening rules provisioning interface, where the SMS message includes MDTSF screening rule information. It is further appreciated that while a table data structure is shown in the embodiments illustrated in FIG. 10, additional data structures suitable for performing message deposit transaction screening may also be used without departing from the scope of the subject matter described herein.

FIG. 11 is a diagram of an exemplary data structure for providing network based message deposit transaction screening including a whitelist functionality according to an embodiment of the subject matter described herein. Referring to FIG. 11, exemplary whitelist screening rules data structures 1100 and 1102 may include a table indexed by called subscriber ID. In table 1100, column 1104 may contain called subscriber IDs, such as telephone numbers or SIP URIs. Column 1106 may include one or more MDTSF screening rule IDs, where the MDTSF screening rule ID may differentiate between multiple screening rule entries associated with a single called subscriber ID. Columns 1108 and 1110 may each include "day of week" and "time of day" information for specifying a time period during which attempted message deposit transactions directed to the called subscriber are to be blocked. Column 1112 may include a message screening rule status indicator for indicating whether the exemplary blacklist screening rules stored in columns 1106-1110 are to be used for screening attempted message deposit transactions directed to the called subscriber ID listed in column 1104.

In exemplary message screening rules table 1102, columns 1114 and 1116 may include called subscriber IDs and MDTSF screening rule IDs, respectively, in a manner similar to that described above with respect to table 1100. In table 1102, rather than maintaining a list of blocked calling subscribers, screening rules table 1102 may provide for only allowing message deposit transactions from specific calling subscribers and/or media types based on the list of allowed calling subscribers and media types listed in columns 1118 and 1120, respectively.

As described above with respect to FIG. 10, screening rules tables 1100 and 1102 may be provisioned by a network operator through a provisioning interface. In another embodiment, these Message Service Screening Rules may be provisioned by a communications service subscriber via a GUI or Web interface. In another embodiment, screening rules 1100 and 1102 may be provisioned by a communications service subscriber via a message service-based interface, such as SMS.

FIG. 12 is a diagram of an exemplary data structure for providing network based message deposit transaction screening including call forward override functionality according to an embodiment of the subject matter described herein. Referring to FIG. 12, exemplary MDTSF "Call Forward Override" (CFO) rules may be used to override MDTSF blacklist/whitelist rules. Accordingly, CFO rules, such as those shown in tables 1200 and 1202, may be applied before whitelist and/or blacklist screening criteria are applied.

Exemplary CFO rules table 1200 may include one or more called subscriber IDs in column 1204 that are associated with a CFO rule ID, "Day or Week", "Time of Day", and Active Rule indicator in columns 1206, 1208, 1210, and 1212, respectively. Upon receiving a query or other message as described above, CFO rules table 1200 may be searched based on the called subscriber ID extracted in the message. For example, a transaction directed to called subscriber ID 9193803814 may be forwarded to the alternate subscriber ID listed in table 1202, for all times of day or week, as the first row in columns 1208-1212 associated with called party ID 9193803814 indicate that call forward override functionality is active and should be applied for all time periods: Referring to table 1202, if the transaction was initiated by calling subscriber ID 9194938000, then a lookup of columns 1214 and 1218 may result in locating the first row in table 1202. The first row in table 1202 indicates that audio transactions should be redirected to redirect address 9194938001. Upon determining the redirect address in column 1222, a MDTSF associated with CFO data structures 1200 and 1202 may generate or modify a signaling message to include the determined redirect address in the appropriate destination portion of the message header.

As mentioned above with respect to FIGS. 10 and 11, exemplary CFO rules data structures 1200 and 1202 may be provisioned by subscribers (e.g., via GUI/Web interface, SMS) or, alternately, via a network service provider.

Figure 13:
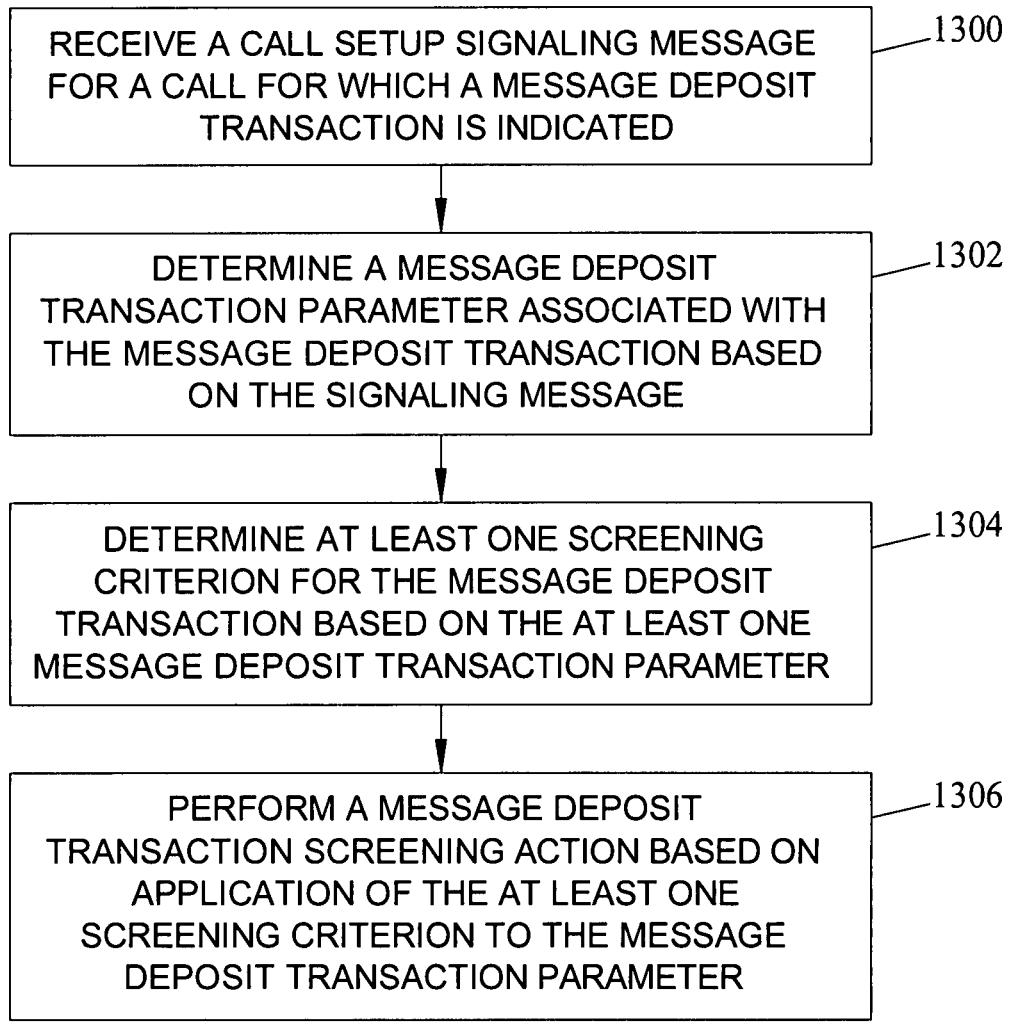
FIG. 13 is a flow chart of an exemplary process for providing network based message deposit transaction screening according to an embodiment of the subject matter described herein.

FIG. 13 is a flow chart of an exemplary process for performing message deposit transaction screening according to an embodiment of the subject matter described herein. Referring to FIG. 13, in block 1300, a call setup signaling message for a call for which a message deposit transaction is indicated is received. The signaling message may include, for example, a TCAP query, an INVITE message, or any other suitable SS7, SIP, IMS, or NGN message associated with performing an attempted message deposit transaction.

In block 1302, a message deposit transaction parameter associated with the message deposit transaction is determined. For example, the message deposit transaction parameter may include a calling subscriber ID, a called subscriber ID, a timestamp, and a media type.

In block 1304, a screening criterion is determined for the message deposit transaction based on the at least one message deposit transaction parameter. For example, a blacklist, whitelist, or other data structure for storing one or more screening criterion may be searched based on the message deposit transaction parameters determined in block 1302. In one embodiment, an attempted message deposit transaction may be prohibited based on a lookup in a blacklist indicating that the calling subscriber is not allowed to perform any message deposit transactions with a particular called subscriber. It is appreciated, however, that the screening criteria applied in block 1304 may include a combination of multiple message deposit transaction parameters and multiple blacklists, whitelists, etc. without departing from the scope of the subject matter described herein.

In block 1306, a message deposit transaction screening action is performed based on application of the at least one screening criterion to the message deposit transaction parameter. For example, if the screening criterion indicates that the message deposit transaction is to be allowed, the associated message deposit transaction screening action may include forwarding the appropriate signaling message(s) to a network node for processing. Alternately, if the screening criterion indicates that the message deposit transaction is to be prohibited, the message deposit transaction screening action may include generating and returning a busy signal to the calling party. Such an embodiment has the benefit of disguising the true reason that the attempted message deposit transaction failed.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing message deposit transaction screening, the method comprising:
   receiving a call setup signaling message for a call for which a message deposit transaction is indicated, wherein the message deposit transaction comprises a voicemail message;
   determining a message deposit transaction parameter associated with the message deposit transaction based on the signaling message, wherein determining a message deposit transaction parameter includes determining at least one of a called party identifier, a calling party identifier, a uniform resource indicator (URI), a timestamp, a content type, and a cause code;
   determining at least one screening criterion for the message deposit transaction based on the at least one message deposit transaction parameter; and
   performing a message deposit transaction screening action based on application of the at least one screening criterion to the message deposit transaction parameter, wherein performing the message deposit transaction screening action includes preventing the voicemail message from being deposited, wherein performing a message deposit transaction screening action includes redirecting the call setup signaling message to a called party identifier not included in the call setup signaling message.

2. The method of claim 1 wherein receiving the signaling message associated with the message deposit transaction includes receiving one of a signaling system 7 (SS7) message, a SIGTRAN message, and a session initiation protocol (SIP message).

3. The method of claim 1 wherein determining at least one screening criterion includes querying a message deposit transaction screening function.

4. The method of claim 1 wherein determining at least one screening criterion for the message deposit transaction includes accessing at least one of a whitelist, a blacklist, and a message deposit transaction redirection data structure.

5. The method of claim 1 wherein performing a message deposit transaction screening action includes generating a response message indicating whether the message deposit transaction is one of allowed, denied, and redirected.

6. The method of claim 1 wherein performing a message deposit transaction screening function action includes terminating the message deposit transaction.

7. The method of claim 1 wherein the determining and performing steps are performed at a network node.

8. The method of claim 7 wherein the network node includes one of a switching point, a softswitch, an application server, a SIP signaling point, and a multimedia message server.

9. The method of claim 7 wherein the network node includes a voicemail server and wherein the determining and performing steps are performed to determine whether to allow deposit of a voicemail message with a voicemail server.

10. A method for message deposit transaction screening, the method comprising:
receiving a signaling message for a call for which a message deposit transaction is indicated, wherein the message deposit transaction comprises a voicemail message;
utilizing a message deposit transaction screening function for determining, based on the signaling message, whether the message deposit transaction is allowed, wherein utilizing a message deposit transaction screening function includes determining a message deposit transaction parameter associated with the message deposit transaction based on the signaling message, wherein determining a message deposit transaction parameter includes determining at least one of a called party identifier, a calling party identifier, a uniform resource indicator (URI), a timestamp, a content type, and a cause code; and
in response to determining that the message deposit transaction is not allowed, preventing the message deposit transaction, wherein preventing the message deposit transaction includes preventing the voicemail message from being deposited and redirecting the call setup signaling message to a called party identifier not included in the call setup signaling message.

11. A system for performing message deposit transaction screening, the system comprising:
a message screening rules database for storing at least one message deposit transaction screening criterion, wherein the at least one screening criterion is associated with at least one message deposit transaction parameter; and
a message deposit transaction screening function communicatively coupled to the message screening rules database for receiving at least one call setup signaling message for a call for which a message deposit transaction is indicated, wherein the message deposit transaction comprises a voicemail message, determining at least one message deposit transaction parameter associated with the message deposit transaction based on the at least one call setup signaling message, wherein determining a message deposit transaction parameter includes determining at least one of a called party identifier, a calling party identifier, a uniform resource indicator (URI), a timestamp, a content type, and a cause code, determining at least one screening criterion for the message deposit transaction based on the at least one message deposit transaction parameter, and performing a message deposit transaction screening action based on application of the at least one screening criterion to the message deposit transaction parameter, wherein performing the message deposit transaction screening action includes preventing the voicemail message from being deposited, wherein performing a message deposit transaction screening action includes redirecting the call setup signaling message to a called party identifier not included in the call setup signaling message.

12. The system of claim 11 wherein the message deposit transaction screening function comprises one of a voicemail, videomail, and multimedia mail deposit transaction screening function.

13. The system of claim 11 wherein the message deposit transaction screening function is located on a voicemail server.

14. The system of claim 11 wherein the at least one signaling message comprises one of a signaling system 7 (SS7) message, a SIGTRAN message, and a session initiation protocol (SIP) message.

15. The system of claim 11 wherein the message deposit transaction screening function is configured to access at least one of a whitelist, a blacklist, and a message deposit transaction redirection data structure.

16. The system of claim 11 wherein the message deposit transaction screening rules function is configured to generate a response message indicating whether the message deposit transaction is one of allowed, denied, and redirected.

17. The system of claim 11 wherein the message deposit transaction screening rules function is configured to terminate the message deposit transaction.

18. The system of claim 11 wherein the message deposit transaction screening function is located at a network node.

19. The system of claim 18 wherein the network node includes one of a switching point, a softswitch, an application server, a session initiation protocol (SIP) signaling point, and a multimedia message service (MMS) server.

20. The system of claim 18 wherein the network node includes a voicemail server and wherein the message deposit transaction screening function is configured to determine whether to allow deposit of a voicemail message with the voicemail server.

21. A system for performing message deposit transaction screening, the system comprising:
a communications function configured to receive a call setup signaling message for a call for which a message deposit transaction is indicated, wherein the message deposit transaction comprises a voicemail message; and
a message deposit transaction query function configured to:
generate, based on the signaling message, a query message for determining whether the message deposit transaction is allowed;

send the query message to a message deposit transaction screening function, wherein the message deposit transaction screening function is configured to determine a message deposit transaction parameter associated with the message deposit transaction based on the signaling message, wherein the message deposit transaction parameter includes determining at least one of a called party identifier, a calling party identifier, a uniform resource indicator (URI), a timestamp, a content type, and a cause code, and to determine at least one screening criterion for the message deposit transaction based on the at least one message deposit transaction parameter;

receive a response message indicating whether the message deposit transaction is allowed based on the at least one screening criterion; and prevent the message deposit transaction based on the response message, wherein the response message indicates that the message deposit transaction is denied, wherein the message deposit transaction query function is configured to prevent the voicemail message from being deposited and to redirect the call setup signaling message to a called party identifier not included in the call setup signaling message.

22. A computer-readable medium encoded with computer-executable instructions for performing steps comprising:

receiving a call setup signaling message for a call for which a message deposit transaction is indicated, wherein the message deposit transaction comprises a voicemail message;

determining a message deposit transaction parameter associated with the message deposit transaction based on the signaling message, wherein determining a message deposit transaction parameter includes determining at least one of a called party identifier, a calling party identifier, a uniform resource indicator (URI), a timestamp, a content type, and a cause code;

determining at least one message deposit transaction screening criterion for the message deposit transaction based on the at least one message deposit transaction parameter; and performing a message deposit transaction screening action based on application of the screening criterion to the message deposit transaction parameter, wherein performing the message deposit transaction screening action includes preventing the voicemail message from being deposited, wherein performing a message deposit transaction screening action includes redirecting the call setup signaling message to a called party identifier not included in the call setup signaling message.

* * * * *